United States Patent [19]

Chandran et al.

[11] 4,420,713
[45] Dec. 13, 1983

[54] TURN-OFF CONTROL MEANS FOR AN AC-TO-DC ELECTRIC POWER CONVERTER

[75] Inventors: Prem G. N. Chandran; Edward S. Matulevich, both of Erie, Pa.

[73] Assignee: General Electric Company, Erie, Pa.

[21] Appl. No.: 429,727

[22] Filed: Sep. 30, 1982

[51] Int. Cl.³ .................... H02P 5/12; H02M 7/155
[52] U.S. Cl. .................................. 318/71; 318/248; 318/344; 318/345 C; 363/68
[58] Field of Search .................. 318/68–72, 318/248, 314, 317, 318, 344, 345 C, 345 G, 345 LB, 345 LA, 441, 442; 363/68

[56] References Cited

U.S. PATENT DOCUMENTS

| | | |
|---|---|---|
| 3,392,319 | 7/1968 | McColl et al. |
| 3,792,325 | 2/1974 | Beger ........................... 318/345 C |
| 3,849,718 | 11/1974 | Forster et al. |
| 4,088,937 | 5/1978 | Uchida et al. ..................... 318/441 |
| 4,121,142 | 10/1978 | Morser et al. ................... 318/345 L |
| 4,181,932 | 1/1980 | Fujiwara ............................. 363/68 |
| 4,263,557 | 4/1981 | Jarvinen ............................. 318/314 |
| 4,288,729 | 9/1981 | Anzai et al. ..................... 318/345 C |
| 4,306,283 | 12/1981 | Kiwaki et al. ....................... 363/68 |
| 4,375,076 | 2/1983 | Magnusson et al. ................. 363/68 |

Primary Examiner—J. V. Truhe
Assistant Examiner—A. Evans
Attorney, Agent, or Firm—Albert S. Richardson, Jr.

[57] ABSTRACT

In the propulsion system of an electric locomotive, a-c wayside power is converted to direct current for the traction motors by a plurality of phase-controlled rectifying circuits having serially connected outputs. To improve power factor, forced commutation means is provided for turning off the controllable valves in one of the circuits at a desired "extinction angle." This angle is varied with motor speed, but its effective range of variation is restricted so as to avoid undesired leading power factor at low speeds, to optimize power factor when the locomotive is running at full power, and to prevent misoperation when the level of load current is low.

15 Claims, 11 Drawing Figures

| | X |
|---|---|
| N8 | .93 |
| N7 | .81 |
| N6 | .73 |
| N5 | .65 |
| N4 | .55 |
| N3 | .41 |

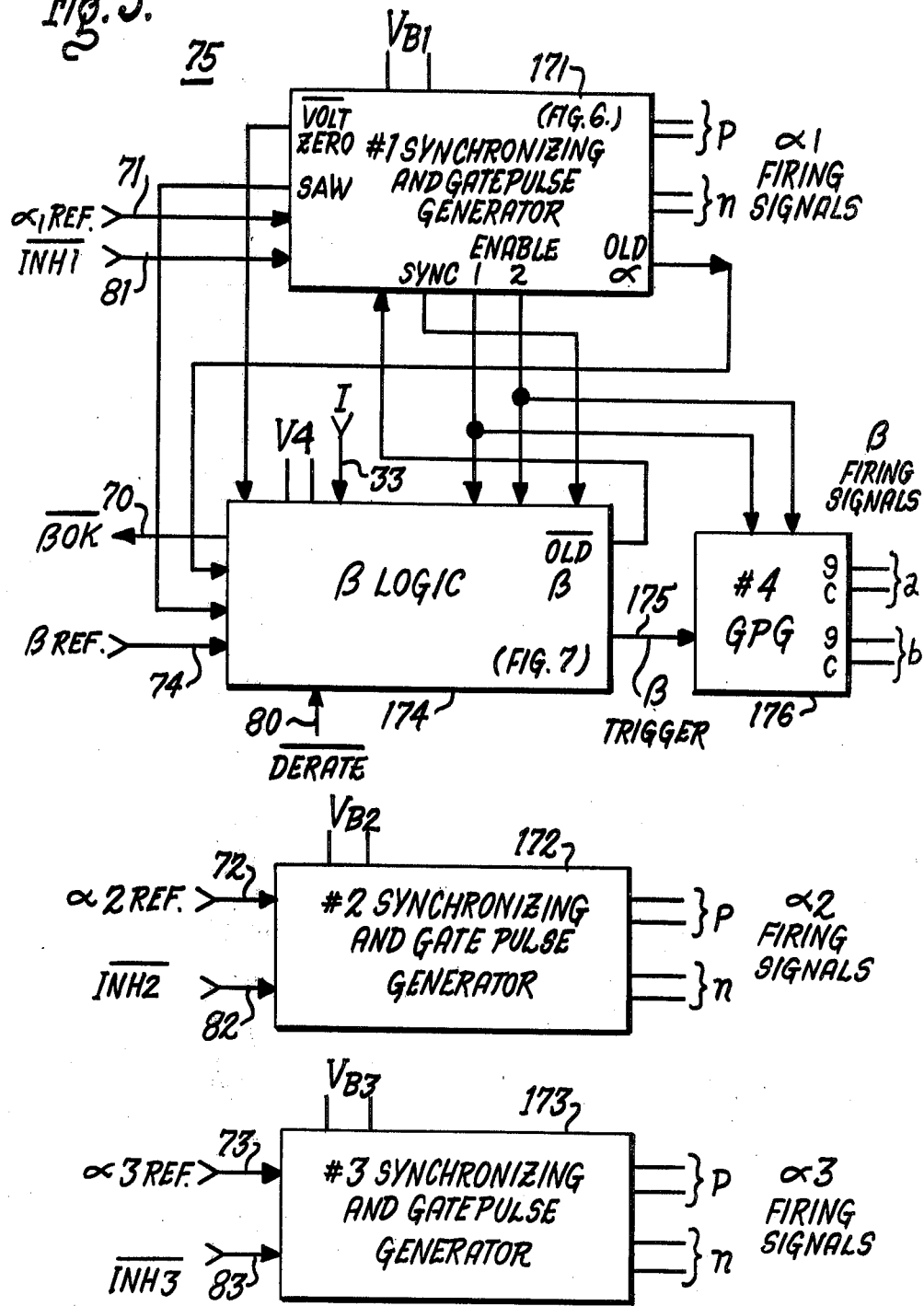

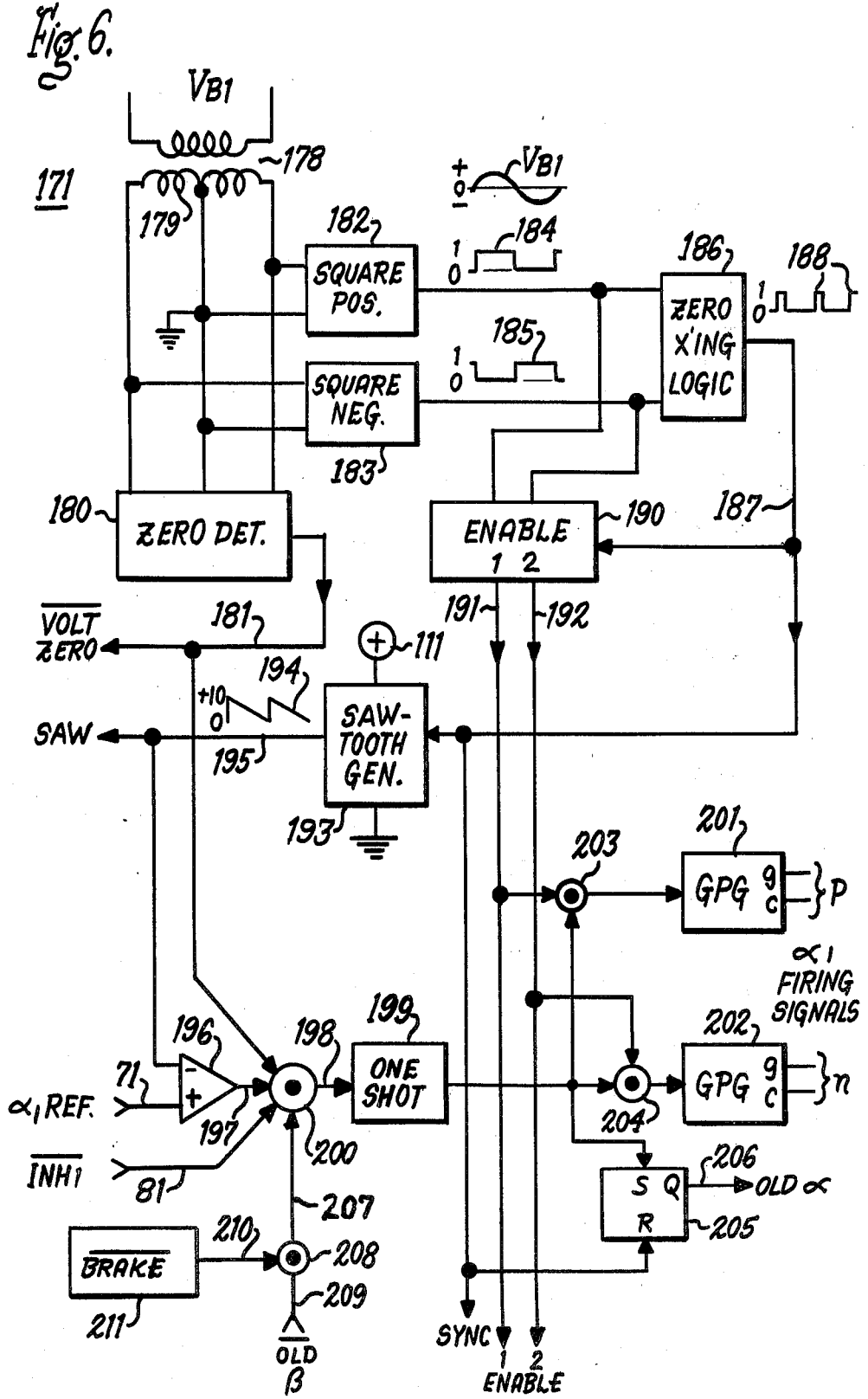

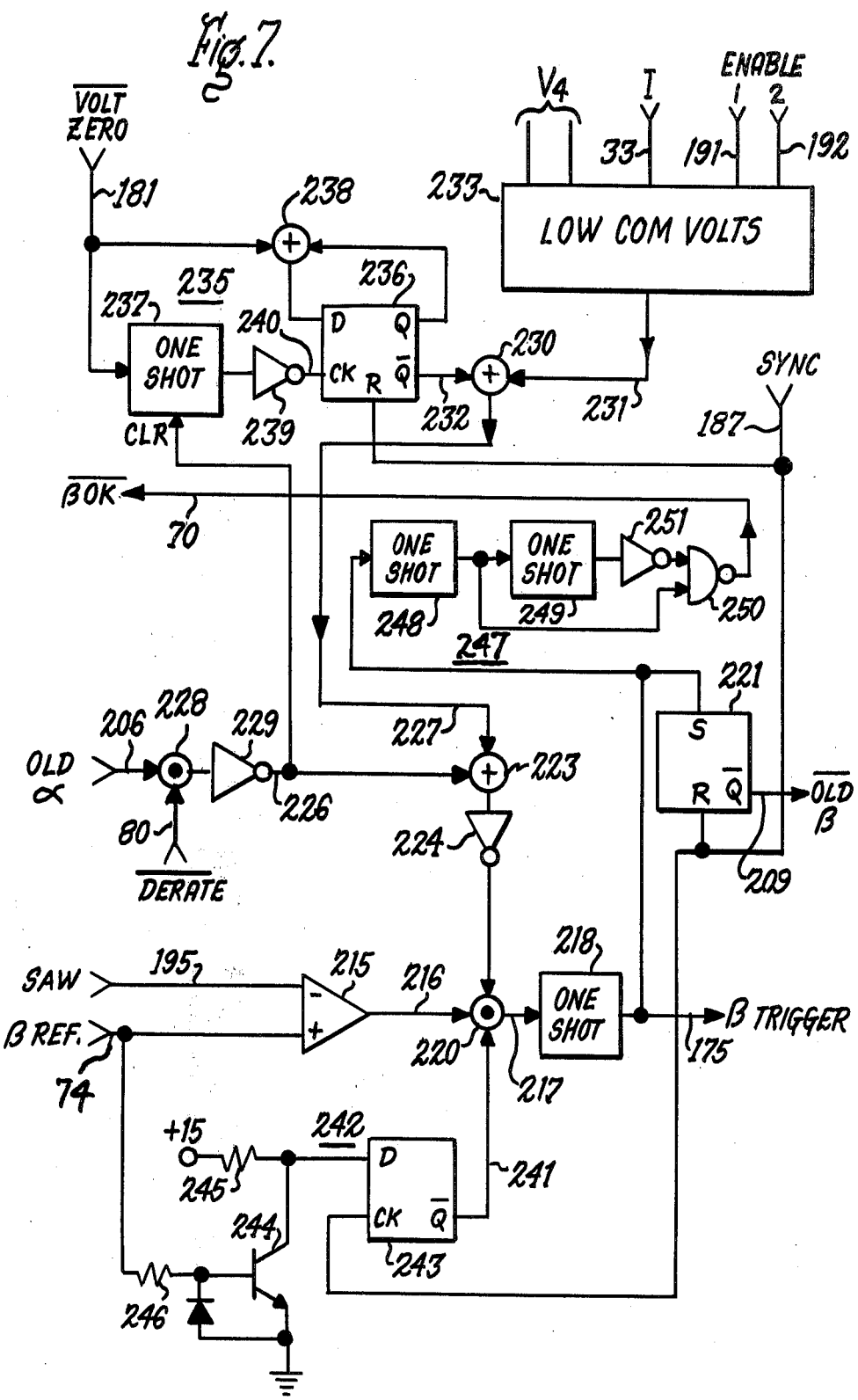

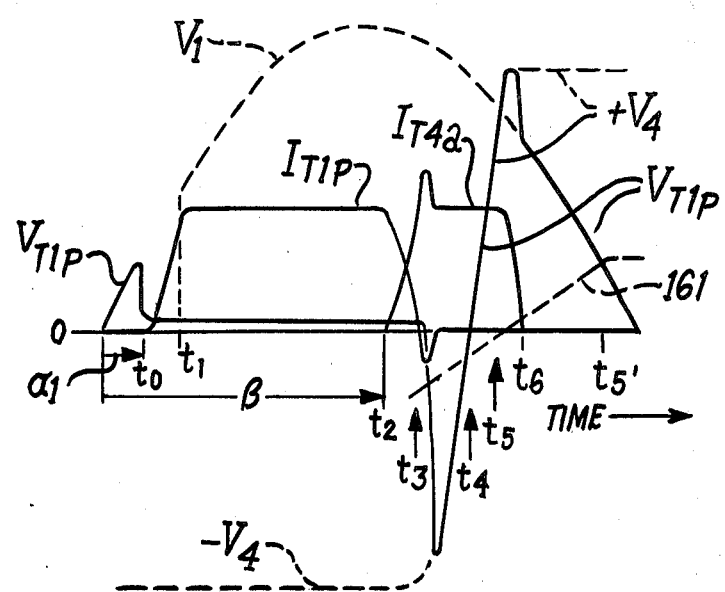

TURN-OFF CONTROL MEANS FOR AN AC-TO-DC ELECTRIC POWER CONVERTER

BACKGROUND OF THE INVENTION

The present invention relates generally to electrical propulsion systems for traction vehicles, and it relates more particularly to improvements in a system using controllable turn on and turn off electric valves to supply direct current (d-c) of variable magnitude to the d-c traction motors on an electric locomotive that is energized from a wayside source of alternating voltage.

Large electrically driven land vehicles such as locomotives and transit cars are propelled by a plurality of traction motors whose rotors are mechanically coupled through speed-reduction gearing to the respective axle-wheel sets of the vehicle. Such motors are usually of the d-c type. If the vehicle is intended to travel along an electrified right of way, it is equipped with a current collector (e.g., a pneumatic or spring-loaded pantograph on the roof of the vehicle) that makes sliding or rolling contact with a bare conductor (e.g., an overhead catenary) extending parallel to the rails or guideway defining the traction vehicle's path of movement. The overhead conductor is part of a power distribution system comprising a plurality of spaced-apart substations which in turn are fed from a stationary source of high-voltage electric power. In practice the power source typically is a commercial power generating plant that supplies 3-phase alternating current (a-c) at a standard frequency such as 60 Hz in the United States or 50 Hz in Europe. Different sections of the overhead conductor are respectively fed from each of the three different phases of the source, and non-conducting segments or "phase breaks" are provided between adjacent sections at predetermined transition points along the right of way to avoid short circuiting any two phases.

In order to convert the a-c power that is available from the wayside distribution system into direct current of variable magnitude suitable for energizing the armature and field windings of the d-c traction motors on the vehicle, the propulsion system includes a voltage step-down power transformer and a controllable electric power converter. The transformer comprises a single-phase, high-voltage primary winding connected between the current collector and the vehicle wheels (which are at ground potential) and a plurality of lower voltage secondary windings. The converter comprises two or more single-phase, full-wave rectifying bridges. Each bridge has two load-current carrying branches or legs connected in parallel with one another between a pair of output terminals which are connected to at least one of the traction motors, and each leg of the bridge comprises at least one pair of serially connected unilaterally conducting electric valves. A transformer secondary winding is connected across the junctures of the respective valve pairs in the two legs of each bridge, thereby applying alternating voltage to the bridge. The bridge is effective to convert the applied alternating voltage to direct voltage at its output terminals.

The valves in at least one leg of each rectifying bridge in the propulsion system of an electric locomotive are usually uncontrolled devices or simple diodes. In order to vary the output voltage of at least one of the bridges, either the other leg of that bridge comprises a pair of serially connected, periodically conducting controllable valves (thereby forming a semi-controlled asymmetrical or "hybrid" rectifying circuit), or the bridge includes an inverse-parallel pair of periodically conducting controllable valves in the a-c connection between the transformer secondary and the juncture of an uncontrolled valve pair. The average magnitude of the output voltage can then be varied as desired by suitably varying, in synchronism with the applied voltage, the "conduction angles" of such controllable valves (i.e., the lengths of their conducting periods, measured in electrical degrees). During intervals when neither of the controllable valves is in a conducting state, there is no current in the associated secondary winding and motor current will coast or "free-wheel" through a diode leg of the rectifying bridge.

For maximum efficiency the controls of the propulsion system on a vehicle such as an electric locomotive are conventionally designed to work the traction motors at substantially constant horsepower throughout a wide speed range of the locomotive. This is usually done by regulating the magnitude of motor current (and hence motor torque) so that it varies inversely with approximately the square root of locomotive speed as the latter varies between a predetermined "corner point" speed and rated maximum speed. But from zero speed to the corner point speed, maximum current is desired in order to provide high tractive force or effort for accelerating the locomotive from rest. In this low speed range, the voltage applied to the armature windings of the traction motors is relatively low because the counter emf of each motor, which is proportional to speed, is relatively low. At maximum speed maximum voltage must be applied to the motors to overcome their high counter emf, while the magnitude of motor current can now be relatively low because the motors draw less current at high speed than at low speed.

To meet the above-reviewed requirements of both low speed and maximum speed propulsion, it has heretofore been common practice to "stage" the rectifying bridges so that initially, as the locomotive is accelerating from rest, the direct voltage applied to a traction motor is provided by a single bridge (which includes controllable valves) and so that later, when the locomotive attains full speed, the motor voltage is the sum of voltages individually contributed by two or more rectifying bridges whose output terminals are interconnected in series. One well known way to do this is to use at least first and second hybrid bridges in series and to control them in sequence so that during the first stage the conduction angle of each controllable valve in the first bridge is continuously increased from zero to maximum (approximately 180 electrical degrees) while motor current passes through the diode leg(s) of the other bridge(s), thereby increasing the average magnitude of motor voltage from zero to a level equalling the maximum output voltage of the first bridge, whereas during a second stage the conduction angle of each controllable valve in the second bridge is similarly increased while maintaining a maximum conduction angle in the first bridge, thereby further increasing motor voltage to a higher level which equals the maximum output voltage of the first bridge plus the output voltage of the second bridge.

In the present state of the art, the main load-current carrying electric valves in the controllable leg of the hybrid rectifying bridge are high-power, solid-state controllable switching devices known as thyristors or semiconductor controlled rectifiers (SCRs). A thyristor is typically a three-electrode device having an anode, a cathode, and a control or gate terminal. When its anode and cathode are externally connected in series with an electric power load and a source of forward anode voltage (i.e., anode potential is positive with respect to cathode), a thyristor will ordinarily block appreciable load current until a firing or trigger signal is applied to the control terminal, whereupon it switches from its blocking or "off" state to a conducting or "on" state in which the ohmic value of the anode-to-cathode resistance is very low. The time at which the thyristor is turned on, measured in electrical degrees from a cyclically recurring instant at which its anode voltage becomes positive with respect to its cathode at the start of the appropriate half cycle of alternating voltage applied to the bridge, is known as the "firing angle." The average magnitude of the output voltage of a hybrid bridge can be varied by retarding or advancing the firing angle as desired. This is popularly known as "phase control." Hereinafter the firing angle is sometimes also referred to as the "ignition angle."

Once a thyristor is turned on, it can be turned off only by reducing its current below a given holding level and applying a reverse voltage across the anode and cathode for a time period sufficient to allow the thyristor to regain its forward blocking ability. In a conventional line-voltage commutated phase-controlled hybrid bridge, a conducting thyristor is naturally turned off at the end of each half cycle of the applied voltage, at which time the corresponding diode in the parallel diode leg of the bridge becomes forward biased and current transfers from the thyristor to the diode. Such current transfer is referred to as commutation, and the length of the commutation interval (when both the outgoing or relieved thyristor and the incoming or relieving diode are simultaneously conducting) will depend on the magnitude of current being commutated and the inductance (including the leakage reactance of the transformer secondary winding) in the paths of changing current.

Phase-controlled rectifier operation imposes a lagging power factor load on the a-c source. In other words, when the ignition angle of the thyristor leg in a conventional hybrid bridge is delayed or retarded from a fully advanced condition, the fundamental component of alternating current in the transformer primary winding tends to lag the fundamental component of the source voltage, and the locomotive draws undesired reactive or apparent power in addition to useful real power from the wayside distribution system. This is particularly objectionable when the propulsion system is in a high, constant horsepower mode and the locomotive is traveling through a region of the electrified right of way that is relatively remote from the nearest wayside substation. To reduce the reactive component of power and consequently to improve the power factor of an electric locomotive (i.e., to obtain a power factor that approaches unity), it has heretofore been proposed to provide means for periodically turning off the main thyristor leg of one of the hybrid rectifying bridges prior to the same time at which commutation would otherwise naturally occur. For this purpose, turn off means known as a forced commutation circuit can be used. Such means enables the conducting thyristor to be quenched or turned off at any desired "extinction angle." The extinction angle, which is measured in electrical degrees from the cyclically recurring negative-to-positive zero crossing of the anode voltage on the main thyristor, marks the time at which suitable action is initiated to turn off the main thyristor and thereby extinguish its current. By appropriately controlling both the ignition angle and the extinction angle of the thyristors in one bridge, the average magnitude of the net output voltage that is applied to the traction motors can be varied as desired while the fundamental component of transformer primary current is positioned to remain nearly in phase with the fundamental component of primary voltage.

A typical forced commutation circuit comprises at least one pair of auxiliary thyristors connected in circuit with at least one commutating capacitor across the respective main thyristors of the rectifying bridge so that each main thyristor in turn is forced to turn off by triggering a complementary one of the auxiliary thyristors. In operation, upon turning on the appropriate auxiliary thyristor the voltage on the precharged commutating capacitor is connected across the then conducting main thyristor with reverse polarity, and load current is quickly diverted from the main thyristor to a parallel path provided by the commutating capacitor and auxiliary thyristor. Thus current is transferred or commutated from the main thyristor to the auxiliary thyristor. After its current is reduced to zero, the main thyristor is temporarily reverse biased by the voltage across the discharging commutating capacitor, and it regains its forward blocking ability during this reverse bias or turn off interval. The extinction angle of the main thyristor therefore coincides with the firing of the auxiliary thyristor.

The aforesaid turn off interval ends when the commutating capacitor is fully discharged. Thereafter load current recharges the commutating capacitor with opposite polarity, and forward anode voltage is reapplied to the turned off main thyristor. the capacitor voltage will soon rise to a magnitude exceeding that of the applied alternating voltage, whereupon the difference therebetween forward biases a previously non-conducting diode in the same rectifying bridge. As a result, load current is now commutated or transferred from the auxiliary thyristor to the diode leg of the bridge. Consequently the auxiliary thyristor turns off and the commutating capacitor is left with a charge of proper polarity for subsequently forcing the other main thyristor to turn off when its complementary auxiliary thyristor is triggered during the succeeding half cycle of operation.

The principle of using forced commutation to obtain unity power factor is further explained in prior art U.S. Pat. No. 3,392,319. Various forced commutation circuits are known, as illustrated, for example, by U.S. Pat. Nos. 3,849,718 and 4,181,932. The ability to control the turn off of the main valves in one of the rectifying bridges of an electric locomotive enables the locomotive to be operated at a desirably high power factor. A high power factor results in lower power losses and less voltage droop, thereby reducing the required size and cost of not only the power transformer on board the locomotive but also the transformers and generators in the wayside electric power system. However, designing a locomotive propulsion system using forced commutation to improve its power factor has necessitated finding solutions to several practical problems.

One problem with a forced commutation circuit of the type incorporating only one commutating capacitor is the possibility that, when the magnitude of load current is low and/or the desired extinction angle is high, the charge on the commutating capacitor can fall below a critical minimum level required for successful commutation because of insufficient recharging time. Another problem is the possible failure to obtain and to maintain coordination between ignition and extinction angles, especially upon initially activating the forced commutation circuit during low speed acceleration of the locomotive and after the locomotive traverses a phase break in the catenary during high speed operation.

Yet another problem is to avoid a leading power factor which could result in the transformer primary voltage rising above its rated maximum level. This problem is most acute (and also most likely to occur) in the low speed range of the locomotive when the power transformer is lightly loaded.

SUMMARY OF THE INVENTION

A general objective of the present invention is to provide new and improved control means for turning on and turning off electric valves in an ac-to-dc converter which is useful in the propulsion system of an electric locomotive having a high power factor.

Another objective of the invention is the provision, for controlling a converter that includes a forced commutation circuit for turning off certain valves, of means for effecting commutation at an extinction angle which is properly coordinated with the turn on operation of the same valves during all starting and running conditions and which is variable over a restricted range having a maximum limit that ensures successful forced commutation over a wide range of load current.

Yet another objective of the present invention is to arrange such valve turn off control means so that misoperation of the commutation circuit is avoided whenever the magnitude of load current is relatively low.

A further objective is to control the propulsion converter on an electric locomotive so as to prevent a leading power factor at relatively low speeds.

In carrying out the invention in one form, the traction motors of an electric locomotive are supplied with direct current by a converter comprising at least first and second separate rectifying bridges whose respective d-c output terminals are serially connected to an electric load circuit that includes at least one of the motors. Each bridge comprises a pair of a-c input terminals and controllable means for interconnecting its input and output terminals. The controllable means include at least one pair of alternately conducting main electric valves, and in the first bridge the main valves have cyclically operative valve turn off means (preferably a forced commutation circuit) respectively associated therewith. In-phase alternating voltages from the secondary windings of a power transformer are respectively applied across the input terminals of the two bridges. A control signal ($V_c$) is provided for both bridges, and its value varies between first and second limits as a function of any error between actual and desired magnitudes of load current. The desired magnitude of current depends on motor speed and a given command signal.

Turn on control means responsive to the control signal is provided (1) for generating a first set of firing signals capable of periodically turning on the main valves in the first bridge at an ignition angle ($\alpha_1$) that varies between maximum retarded and maximum advanced conditions as $V_c$ varies over a first range of values extending from its first limit to a preselected intermediate value and (2) for generating a second set of firing signals capable of periodically turning on the main valves in the second bridge at an ignition angle ($\alpha_2$) that varies between maximum retarded and maximum advanced conditions as $V_c$ varies over a second range extending from approximately its preselected intermediate value to another value outside of the first range. In addition, we provide improved turn off control means normally operative for periodically initiating operation of the valve turn off means in the first bridge at a desired extinction angle ($\beta$).

In accordance with one aspect of the present invention, the turn off control means is so constructed and arranged that $\beta$ varies as a function of motor speed. More particularly, $\beta$ is varied with motor speed up to a first speed threshold and is clamped at a predetermined maximum limit when motor speed is higher than the first threshold. This maximum limit ensures that, so long as the magnitude of load current is not too low, a sufficient interval of time will be available after a main valve turns off for the commutating capacitor in the commutation circuit to be adequately recharged before the beginning of the next half cycle of the alternating voltage applied to the input terminals of the first bridge. In another aspect of the invention, the turn off control means includes disabling means effective whenever the magnitude of load current is less than a predetermined low level for preventing normal operation of the turn off control means and thereby disabling the valve turn off means. This will avoid any misoperation of the commutation circuit when load current is too low to recharge the capacitor during the available recharging interval.

In a different aspect of the invention, the aforesaid disabling means is also effective to prevent normal operation of the turn off control means whenever motor speed is lower than a preselected minimum which depends on the command signal, and the aforesaid turn on control means includes clamping means effective whenever the valve turn off means is disabled and the magnitude of load current is not lower than the aforesaid predetermined low level for preventing $\alpha_1$ from becoming smaller than a predetermined minimum angle which preferably is of the order of 70 to 75 electrical degrees. The preselected minimum motor speed is chosen to be higher than a speed at which the motor voltage equals the average magnitude of voltage that the first bridge can output with $\alpha_1$ equal to the aforesaid minimum angle. Consequently, $V_6$ must have a value in its second range (and $\alpha_2$ will be somewhere between fully retarded and fully advanced) before the turn off control means can begin normal operation during acceleration of the locomotive from rest. This feature of the invention, in combination with the aforesaid maximum limit of $\beta$, ensures that the second bridge will always be contributing a portion of the net output voltage of the converter when operation of the valve turn off means in the first bridge is permitted. In other words, any time the valve turn off means is operative in the first bridge, motor speed is sufficiently high to ensure that the voltage applied to the load circuit comprises the sum of output voltages individually contributed by both of the first and second bridges. This prevents the locomotive from having an undesired leading power factor.

Another aspect of the invention comprises means associated with the turn off control means for blocking any valve turn off operation thereof following a period of time when the aforesaid disabling means is effective for an additional interval which terminates in response to the turning on of a main valve in the first bridge during the half cycle of applied alternating voltage that immediately succeeds the half cycle in which the disabling means stopped being effective. This additional delay provides initial coordination or synchronization between the extinction and ignition angles. Regardless of the instant of time at which the disabling means initially permits normal operation of the turn off control means, no turn off will be attempted before the first valve to be turned off by operation of the valve turn off means is actually turned on.

In yet another aspect of the invention, proper coordination between the ignition and extinction angles for the first bridge is maintained after the locomotive traverses a phase break in the catenary at high speeds by arranging the aforesaid disabling means to be also effective for preventing normal operation of the turn off control means whenever $V_c$ has a value between its first limit and the value at which $a_1$ is equal to a certain angle which is smaller than the aforesaid maximum limit of $\beta$ but not smaller than the aforesaid predetermined minimum angle of $a_1$.

The invention will be better understood and its various objects and advantages will be more fully appreciated from the following description taken in conjunction with the accompanying drawings.

BRIEF DESCRIPTION OF THE DRAWINGS

FIG. 5 is an expanded functional block diagram of the firing synchronizing and pulse generator block of FIG. 2;

FIG. 6 is schematic diagram of the #1 synchronizing and gate pulse generator circuit shown as a single block in FIG. 5, the output of this circuit comprising a first set of firing signals for the pair of main valves in the first bridge;

FIG. 7 is a schematic diagram of the "β logic" circuit shown as a single block in FIG. 5, the output of this circuit comprising β trigger signals which periodically activate the turn off gate pulse generator block labeled "#4 GPG" in FIG. 5;

FIG. 8 is a chart illustrating how voltage and current vary with time in certain components of the first rectifying bridge during a half cycle of transformer secondary voltage.

DETAILED DESCRIPTION

Figure 1:
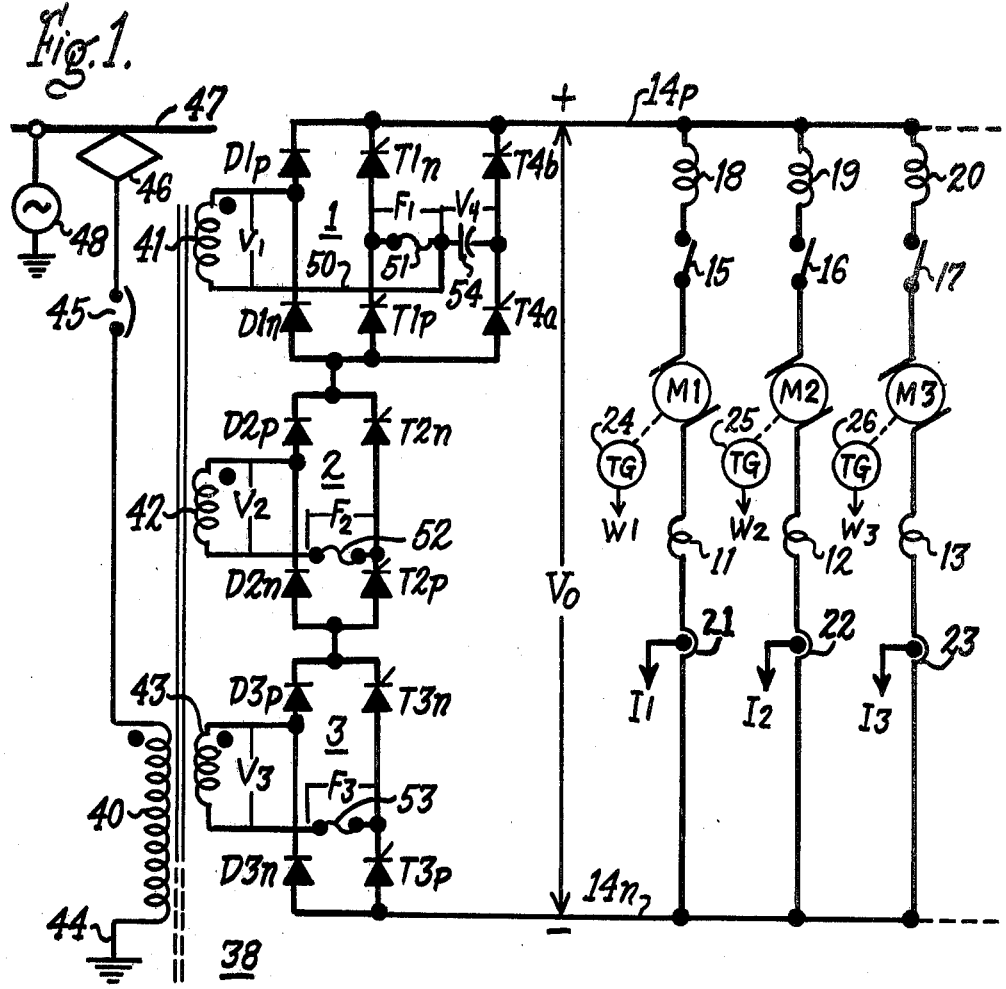
FIG. 1 is a schematic circuit diagram of part of an electric propulsion system on board a vehicle such as an electric locomotive, the illustrated part of the system comprising a single-phase transformer and three serially interconnected hybrid rectifying bridges that convert wayside a-c electric power to d-c power for energizing one group of traction motors on the vehicle, with the first one of the three bridges including controllable turn on and turn off valves.

FIG. 1 depicts an electric propulsion system comprising a group of three d-c traction motors M1, M2, and M3 suitable for propelling or retarding a large traction vehicle such as a locomotive or transit car. Although not shown in the drawings, it will be understood that the rotors of these motors are respectively coupled by speed-reduction gearing to separate axle-wheel sets of one truck of the locomotive. A 3-axle truck has been assumed; only two motors would be used on a 2-axle truck. A second group of three (or two) duplicate motors which are associated with the other truck of the locomotive has been omitted in FIG. 1 for the sake of drawing simplicity.

The motors M1, M2, and M3 are respectively provided with field windings 11, 12, and 13. In the illustrated embodiment of the invention, these field windings are in series with the respective armature windings of the motors whenever the propulsion system is in its motoring mode of operation. The motors are connected in parallel with one another across a pair of relatively positive and negative d-c power conductors 14$p$ and 14$n$, respectively. As is shown in FIG. 1, conventional isolation contactors 15, 16 and 17, current smoothing reactors 18, 19 and 20, and suitable current transducers 21, 22, and 23 are respectively connected in series with the three motors between the d-c conductors. The current transducers 21, 22, and 23 provide signals I1, I2, and I3 proportional to the magnitudes of current in the armatures of the motors M1, M2, and M3, respectively. Three speed sensors 24, 25, and 26 of conventional design are respectively coupled to the rotors of the motors or to the axle-wheel sets of the locomotive truck to provide signals W1, W2, and W3 having frequencies that vary with the angular velocities of the respective motor armatures. Assuming good adhesion between wheels and track, locomotive speed (miles or kilometers per hour) is proportional to motor speed (revolutions per minute). Assuming equal adhesion and equal wheel diameters, the three signals W1, W2, and W3 will have substantially equal values.

Figure 1A:
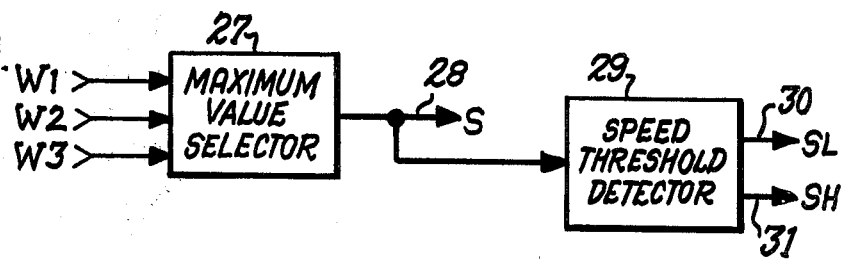
FIGS. 1A and 1B are functional block diagrams of means for providing feedback signals representative of traction motor speed and current, respectively.

As can be seen in FIG. 1A, the signals W1, W2, and W3 from the three speed sensors are fed to a maximum value selector 27 which produces on a line 28 a speed feedback signal S representative of the highest speed of the three motors M1, M2, and M3. The value of S will vary between 0 when the locomotive is at rest and 1.0 per unit when the locomotive is moving at its maximum rated speed (e.g., 75 mph). The speed feedback signal S is supplied to the input of a speed threshold detector 29 which has two output lines 30 and 31. The detector 29 is suitably designed and constructed to produce an output signal SL on the line 30 in response to speed attaining a relatively low threshold (e.g., approximately 0.07 per unit) and to produce an output signal SH on the line 31 in response to speed attaining a predetermined high threshold (e.g., approximately 0.40 per unit). In the illustrated embodiment of the invention, each of the output signals SL and SH is a digital logic signal, i.e., it is low or "0" so long as S has a value indicating that motor speed is lower than the designated threshold, whereas it is high or "1" whenever S indicates motor speed equals or exceeds that threshold.

Figure 1B:
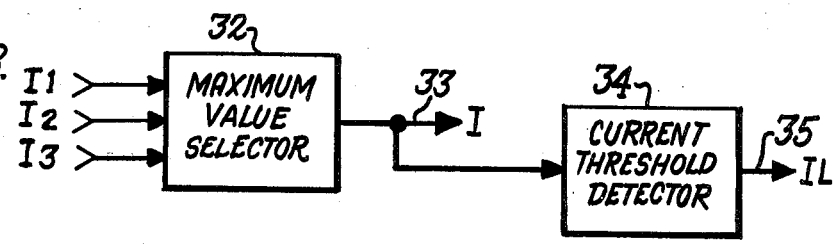

As can be seen in FIG. 1B, the signals I1, I2, and I3 from the three current transducers are fed to a maximum value selector 32 which produces on a line 33 a current feedback signal I representative of the magnitude of direct current in whichever one of the three motors M1, M2, and M3 has the highest current. The current feedback signal I is supplied to the input of a current threshold detector 34 which is suitably designed and constructed to produce an output signal IL on a line 35 in response to the magnitude of motor current attaining a predetermined low level (e.g., 400 amps). The output signal IL is low or "0" so long as I has a value indicating that the magnitude of motor current is lower than such a level, whereas it is high or "1" whenever I indicates motor current equals or exceeds that level.

Returning now to FIG. 1, the d-c power conductors 14p and 14n are coupled to the secondary of a power transformer 38 via an electric power converter comprising three full-wave rectifying circuits 1, 2, and 3. The power transformer has a single-phase primary winding 40 and a plurality of secondary windings, including first, second and third windings 41, 42, and 43, respectively. One terminal of the transformer primary winding 40 is connected to a path 44 at ground potential (e.g., the platform, axles, and wheels of the locomotive and the rails of the track on which the locomotive travels), and the other terminal of winding 40 is connected via the separable main contacts 45 of a power circuit breaker (preferably of the vacuum breaker type) to a suitable current collector 46 on the vehicle (e.g., a pantograph) that maintains sliding contact with an overhead conductor 47 (e.g., a catenary). The catenary 47 is part of a wayside a-c power distribution system that supplies alternating current to the locomotive from a stationary source 48 at substantially constant frequency and relatively high voltage with respect to ground (e.g., 25,000 volts rms at the catenary sections that adjoin wayside power substations). The transformer 38 steps down the source voltage to single-phase alternating voltages V1, V2, and V3 of lower magnitude (e.g., 555 volts rms) on the secondary windings 41, 42, and 43, respectively. These voltages are substantially in phase with one another. While only one set of three secondary windings are shown in FIG. 1, in practice additional secondaries would ordinarily be used.

The three rectifying circuits 1, 2, and 3 shown in FIG. 1 are hybrid or semi-controlled asymmetrical bridges. Each of them has first and second legs connected in parallel with one another between a pair of d-c output terminals. The first leg of each bridge comprises at least one pair of serially connected uncontrolled electric valves D1p and D1n, whereas the second leg comprises at least one pair of serially connected, alternately conducting controllable main electric valves T1n and T1p. All of these valves are polled to conduct current in a direction from the relatively negative to the relatively positive d-c output terminal. In the presently preferred embodiment of the invention, the uncontrolled valves are solid-state power rectifier diodes, and the controllable valves are solid-state controlled rectifiers or thyristors. While each such device has been shown and described in the singular, in practice it can actually comprise a combination of two or more duplicate devices that are interconnected in parallel (to increase the forward current rating of the leg) and/or in series (to increase the reverse voltage rating).

As can be seen in FIG. 1, the three secondary windings 41, 42, and 43 of the power transformer and respectively connected between the juncture of the diodes D p and D n in the first legs of the respective bridges and, via current limiting fuses 51, 52, and 53, respectively, the juncture of the thyristors T n and T p in the second legs of the respective bridges, whereby in-phase alternating voltages are respectively applied to corresponding a-c input terminals of the three bridges 1, 2, and 3. The d-c terminal pairs of the bridges are connected in series with one another, whereby the output voltage $V_o$ of the converter is the sum of the direct voltages at the individual outputs of the respective bridges 1, 2, and 3. This net output voltage is applied to the load circuit comprising the d-c power conductors 14p and 14n, the armature and series field windings of the parallel array of traction motors M1, M2, and M3, and the reactors 18–20 that are in series with the respective motors. By suitably controlling the thyristor legs of the separate bridges, the average magnitude of $V_o$ can be varied as desired.

Each of the three bridges 1, 2, and 3 includes appropriate means for producing a fault signal F1, F2, or F3 in the abnormal event of a short circuit in the bridge. Such means can comprise, for example, a conventional "trigger" mechanism associated with each of the current limiting fuses 51, 52, and 53 for indicating if and when the current interrupting element of the fuse is ruptured by the overcurrent that will flow in the a-c connections of the bridge if either one of the associated pair of main thyristors were shorted (i.e., if a thyristor were to fail to withstand reverse voltage). Alternatively, the overcurrent signal can simply comprise the voltage that will be present across the terminals of the fuse once its interrupting element has blown.

In order to reduce the amount of reactive power that the illustrated propulsion system draws from the wayside source 48 and thereby to increase the power factor of the locomotive, means for controlling the extinction angle of the main thyristors T1p and T1n in the first bridge 1 is desired. For this purpose these thyristors have cyclically operative valve turn off means respectively associated therewith. In the presently preferred embodiment of the invention, the valve turn off means is a forced commutation subcircuit 4 comprising at least one pair of auxiliary controlled rectifiers T4a and T4b connected in circuit with at least one commutating capacitor 54 across the respective main thyristors T1p and T1n in bridge 1. More specifically, the auxiliary rectifiers are serially connected between the negative and positive output terminals of the bridge 1, and the capacitor 54 spans the juncture of these devices and the juncture of the fuse 51 and a line 50 connecting the fuse 51 to the no-dot end of the transformer secondary winding 41. With this arrangement, during a positive half cycle of the applied voltage V1 (i.e., the half cycle during which the dot end of the secondary winding 41 is positive with respect to the line 50), the main thyristor T1p can be forced to turn off by turning on its complementary auxiliary rectifier T4a, and during a negative half cycle of V1 the main thyristor T1n can be forced to turn off by turning on its complementary auxiliary rectifier T4b. While there are a variety of different forced commutation circuits that are suitable for turning off the main thrysitors in the first bridge, the particular subcircuit 4 that is shown in FIG. 1 is preferred because it is relatively simple and inexpensive. Suitable means (not shown) is provided for precharging the commutating capacitor 54 so that prior to any phase control operation of the rectifying bridge 1 the capacitor voltage V4 has sufficient magnitude for successful commutation.

The operation of the bridge 1 will now be briefly summarized with reference to FIG. 8 which displays a typical half cycle during which both ignition and extinction angles of the thyristor leg are controlled. Assume that the commutating capacitor 54 is charged so that the electric potential at the juncture of the rectifiers T4a and T4b is negative with respect to the line 50, and also assume that appreciable load current (e.g., 4,500 amps) is flowing through the parallel array of traction motors M1, M2, and M3. At the beginning of a positive half cycle of transformer secondary voltage V1, load current will freewheel through the diode leg D1n, D1p of the bridge 1, there is negligible voltage across the d-c output terminals of this bridge, and V1 is applied as a forward anode-to-cathode bias $V_{T1p}$ across the main thyristor T1p which withstands this voltage until time $t_0$ when its control electrode or gate receives a firing signal at the desired ignition angle $\alpha_1$. The firing signal turns on T1p, whereupon load current is commutated from diode D1n to thyristor T1p. The rate at which current increases in T1p and decreases in D1n depends on the leakage reactance of the transformer secondary winding 41 and the amount of any other inductance in series with these devices. (While not shown in FIG. 1, it is conventional practice to provide a commutating inductor between the juncture of the main thyristors and the line 50.) During the interval $t_0-t_1$ when both D1n and T1p are simultaneously conducting, known as the commutation interval, the voltage applied to the bridge collapses (which condition is sometimes referred to as a "commutation notch"). However, as soon as thyristor current $I_{T1p}$ attains the magnitude of load current and the diode D1n stops conducting, (at time $t_1$) the voltage on the output terminals of the bridge 1 rises to a magnitude equal to the instantaneous magnitude of the transformer secondary voltage V1, and the output voltage will then remain equal to V1 throughout the remainder of the conduction angle of the thyristor T1p (i.e., interval $t_0-t_3$). The forward voltage drop across T1p is negligible while this device is in its conducting state.

Subsequently, at time $t_2$ which coincides with the desired extinction angle $\beta$, the auxiliary rectifier T4a is turned on and load current will be commutated from T1p to T4a. The current $I_{T4a}$ now flowing in T4a initially discharges the commutating capacitor 54 and then recharges it with opposite polarity. The rate of change of capacitor voltage V4 depends on the magnitude of load current. During the capacitor discharging interval $t_2-t_4$, the main thyristor T1p has its current reduced to zero and is then temporarily reverse biased by V4. The period between the time $t_3$ at which forward current in T1p decays to zero and the time $t_4$ at which the capacitor is fully discharged (V4 is zero) is known as the circuit turn off interval, and during this interval T1p regains its forward blocking ability. After the turn off interval, the commutating capacitor recharges and soon, at time $t_5$, its voltage V4 rises to a magnitude exceeding the instantaneous magnitude of V1, whereupon the difference between V4 and V1 forward biases the diode D1n. As a result, load current now quickly commutates from the auxiliary rectifier T4a to the doide D1n. The capacitor continues to be recharged during this commutation interval $(t_5-t_6)$, and its voltage V4 overshoots V1. When T4a stops conducting (at $t_6$) the capacitor 54 is left with a charge of proper polarity and sufficient magnitude for subsequently forcing the other main thyristor T1n to turn off when its complementary auxiliary rectifier T4b is fired at the desired extinction angle during the succeeding negative half cycle of alternating voltage V1. When T4a turns off, V1 is reapplied to the now turned off main thyristor T1p, and load current again freewheels through the diode leg D1n, D1p of the bridge 1 until the other main thyristor T1n is subsequently turned on, at the desired ignition angle, during the negative half cycle of V1.

Figure 2:
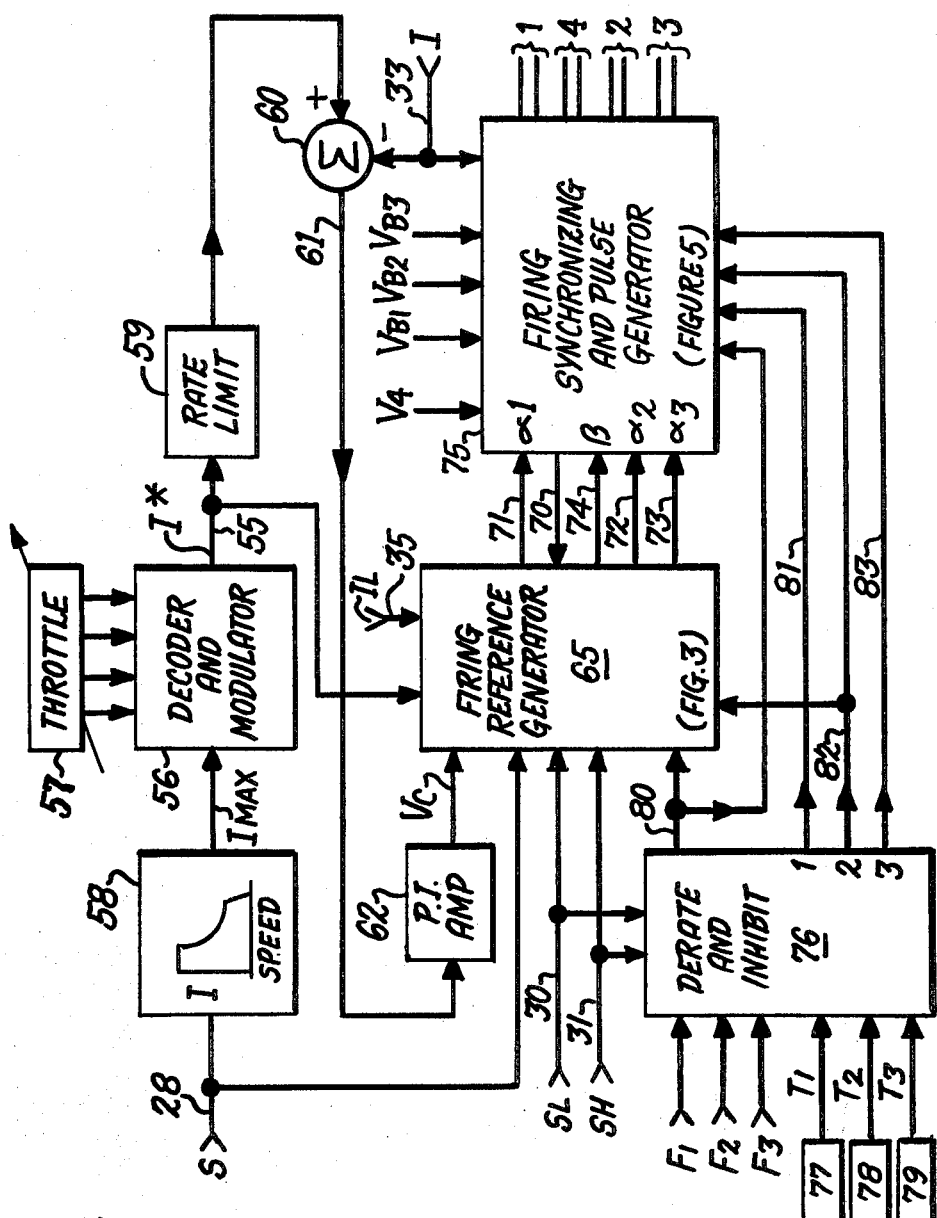
FIG. 2 is a functional block diagram of the controls for the rectifying bridges shown in FIG. 1, which controls include the improvement of the present invention for controlling the turn off of the controllable main valves in the first bridge.

FIG. 2 depicts the controls that provide properly timed firing signals for the gates of the main thyristors in the three rectifying bridges 1, 2, and 3, respectively, and for the gates of the auxiliary controlled rectifiers in the forced commutation subcircuit 4 of the first bridge 1. A conventional closed loop control system is employed, whereby motor current (and hence tractive effort) is regulated to correspond to a desired magnitude. The desired current magnitude is represented by a current call signal I* which is produced on the output line 55 of a block 56 labeled "decoder and modulator." Inputs to this block are provided by an operator controlled throttle 57 and by a motor speed responsive reference generator 58. The reference generator 58 in turn is connected to the speed feedback signal S on line 28. It is suitably constructed and arranged to supply the decoder and modulator 56 with a maximum current signal having a value which varies as a function of motor speed in the manner indicated by the graph drawn inside the block 58. For any motor speed between zero and a predetermined corner point speed (e.g., nearly 30% of the rated maximum motor speed), the maximum current signal has a constant, relatively high value that results in the proplusion system exerting a relatively high tractive effort, but from corner point speed to maximum speed the value of this signal will decrease with the square root of increasing motor speed so that the horsepower of the propulsion system is high and substantially constant.

The value of the maximum current signal is modulated, according to the given setting of the locomotive throttle 57, by the decoder and modulator 56. The handle of the throttle 57 conventionally has an idle position and eight other discrete positions or power notches, and the particular position that the operator has selected is indicated by a system of relays whose contact positions are decoded in the block 56. The throttle setting is herein referred to as a command signal. At any given motor speed, the value of the current call signal I* on line 55 is incrementally increased as the throttle position is advanced from idle to notch 8. Therefore maximum torque is realized in notch 8. The block 56 includes reset means for automatically reducing I* to a value corresponding to zero current when desired.

As is indicated in FIG. 2, the output line 55 of the block 56 is connected to a rate limit circuit 59 whose output supplies a current reference signal to one input of a summing point 60. The rate limit circuit 59 performs the conventional function of preventing the value of the current reference signal from being changed too fast. By way of example, the maximum rate of increase of the reference signal can be limited to a rate corresponding to 150 amps per second. The summing point 60 has another input which is supplied with the current feedfailure of any one of the valves in the diode leg of the associated bridge 1, 2, or 3.

As is shown in FIG. 2, the derate and inhibit block 76 has four output lines 80 through 83 connected to the block 75, and two of these lines (80 and 82) are also connected to the block 65. The block 76 includes logic circuits suitably arranged to produce a derate signal on the output line 80 and inhibit signals on the respective lines 81, 82, and 83 in response to various combinations of the signals that are received at its inputs. The construction and operation of such logic circuits are more fully described and are claimed in the patent application Ser. No. 429,729 filed concurrently herewith in the name of Edward S. Matulevich and assigned to General Electric Company. Briefly summarized, the circuits in block 76 are effective to produce:

(1) a first inhibit signal on the line 81 for preventing the generation of the first set of firing signals for bridge 1 in the event of an overcurrent signal F1 or T1 (indicating a bridge 1 fault);

(2) a second inhibit signal on the line 82 for preventing the generation of the second set of firing signals for bridge 2 and for adjusting the firing reference generator 65 so that the third reference signal on line 73 varies between 0 and +10 volts as the control signal $V_c$ varies over its second range of values (a) in the event of an overcurrent signal F2 or T2 (indicating a bridge 2 fault) or (b) whenever there is no bridge 1 fault, and motor speed is lower than the aforesaid low threshold (as indicated by the signal SL being "0");

(3) a derate signal on the line 80 for inhibiting the firing signals for the auxiliary rectifiers in the forced commutation subcircuit 4, for imposing a predetermined minimum limit on $\alpha_1$ (unless the magnitude of load current is lower than the aforesaid low level, as indicated by the signal IL being "0"), and for imposing the same minimum limit on $\alpha_3$ in the event of a fault in either bridge 1 or bridge 2; and (4) a third inhibit signal on the line 83 for preventing the generation of the third set of firing signals for the bridge 3 whenever (a) there are no overcurrent signals, and motor speed is lower than the aforesaid high threshold (as indicated by the signal SH being "0"), or (b) there is an overcurrent signal F3 or T3 (indicating a bridge 3 fault), or (c) there is a fault in bridge 1 or 2 but not in bridge 3, and motor speed is lower than its predetermined low threshold.

The aforesaid low threshold of motor speed is selected to be approximately equal to a calculated rate at which the first bridge is capable of supplying as much current to the motors as both bridges 1 and 2 combined under a condition of relatively low transformer primary voltage, which low voltage condition exists when the locomotive is a long distance from the nearest in-service wayside substation. It can be shown that under such a low voltage condition and at speeds below the calculated rate more current can be obtained from the output bridge 1 alone than from the combined outputs of bridges 1 and 2, and therefore the maximum attainable performance of the propulsion system is increased by inhibiting the firing signals for bridge 2 (unless there is a fault in bridge 1) in the manner described in subparagraph 2b above.

The aforesaid high threshold of motor speed is selected to be approximately equal to another calculated rate at which the combination of bridges 1 and 2 is capable of supplying as much current to the motor as all three bridges combined under a low voltage condition.

With low primary voltage and at speeds below the latter rate, more current can be obtained without an output from bridge 3 than with such an output, and therefore the maximum attainable performance of the propulsion system is increased by inhibiting the firing signals for bridge 3 (unless there is a fault in birdge 1 or 2) in the manner described in subparagraph 4a above.

The derate function described in subparagraph 3 above is a desirable feature if the power transformer 38 is so designed that the volt-ampere rating of each of its first and third secondary windings 41 and 43 is less than the volt-ampere rating of its secondary winding 42. Such a rating discrepancy is feasible because, in normal motoring operation of the propulsion system, the winding 42 will be subjected to an electric load that is higher than the load on winding 41 (because the conduction angles of the main thyristors in bridge 1 are normally limited by the periodic turn off action of the forced commutation subcircuit) and that is also higher than the load on the third winding 43 (because bridge 3 is in operation only at relatively high speeds when the magnitude of motor current is relatively low). However, in response to a fault in bridge 2, this bridge is removed from service, forced commutation of the thyristor leg of bridge 1 is prevented, and the controls are adjusted so that bridge 3 in effect is substituted for bridge 2. Now, except for the minimum limits imposed on $\alpha_1$ and $\alpha_3$ by the derate signal, both secondary windings 41 and 43 could be overloaded.

Figure 3:
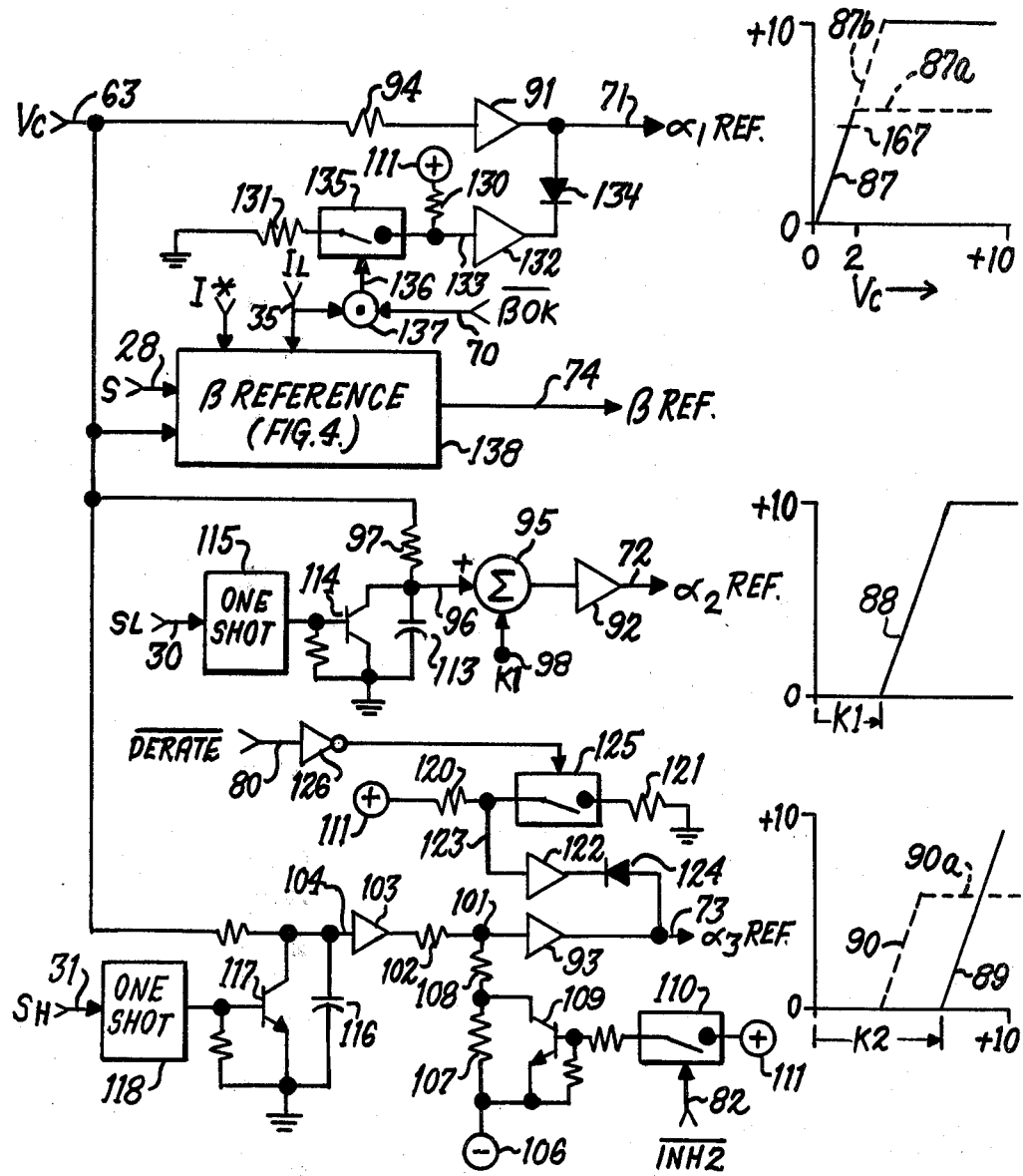
FIG. 3 is a schematic diagram of the firing reference generator circuit shown as a single block in FIG. 2, this circuit having three "αREF." outputs which respectively determine the ignition angles of the controllable main valves in the three hybrid bridges and having a "βREF." output which determines the extinction angle of the main valves in the first bridge.

FIG. 3 shows circuit details of the presently preferred embodiment of the firing reference generator 65. In the illustrated circuit, the control signal $V_c$ is fed to the inputs of three separate amplifiers 91, 92, and 93, and the first, second, and third reference signals on lines 71, 72, and 73 are respectively developed at the outputs of these amplifiers. Each of the amplifiers 91–93 has a gain of approximately 3 so that its output varies from 0 to +10 volts in response to an input signal excursion from 0 to +3.33 volts. In a manner and within limits that will be described hereinafter, the ignition angles of the main thyristors in each of the bridges 1, 2, and 3 will vary inversely with the value of the corresponding reference signal, being nominally 180 electrical degreees (fully retarded) whenever the reference signal has a negative or zero value and being nominally 0 degrees (fully advanced) when the reference signal is +10 volts. The input of the first amplifier 91 is connected to the control signal line 63 via a resistor 94, and as $V_c$ varies the first reference signal ($\alpha_1$ REF) on the output line 71 of this amplifier varies as shown by the trace 87 in the graph at the top of the right side of FIG. 3.

The input of the second amplifier 92 is connected to the control signal line 63 via a summing point 95, a line 96, and a resistor 97. Suitable means, represented in FIG. 3 by a terminal 98, is connected to the summing point 95 for subtracting a constant bias signal K1 from the control signal so that the input signal to the amplifier 92 comprises the difference between $V_c$ and K1. The value of K1 coincides with the aforesaid first intermediate value of $V_c$. It is selected to be +3.33 volts in the illustrated embodiment of the converter controls. The resulting variation of the second reference signal ($\alpha_2$ REF) on the output line 72 of the second amplifier as $V_c$ varies is shown by the trace 88 in the graph drawn in the middle of the right side of FIG. 3. Whenever $V_c$ is less than 3.33 volts, $\alpha_2$ REF is negative.

The input of the third amplifier 93 is connected to the control signal line 63 via a summing point 101, a resistor back signal I on the line 33, and its output is an error signal which is representative of the difference between actual and desired magnitudes of motor current. Preferably the quiescent value of the error signal (i.e., its value whenever both the desired and actual magnitudes of current are zero) is slightly negative with respect to a predetermined reference potential. The error signal is supplied via a line 61 to a suitable gain network or amplifier 62 having a proportional plus integral transfer characteristic, whereby a zero steady-state error can be obtained. The amplifier 62 produces a control signal $V_c$ which is fed on a line 63 to one of the inputs of a block 65 labeled "firing reference generator." The value of $V_c$ varies, within limits, as a function of any difference or error between the current reference and feedback signals. So long as the error signal is "positive" (i.e., so long as the actual current magnitude is less than desired), the amplifier 62 causes $V_c$ to vary in a sense approaching a predetermined upper limit. The value of $V_c$ determines the ignition angles of the thyristor legs of the respective rectifying bridges 1, 2, and 3, and it will tend to assume whatever value results in reducing the error signal on line 61 to zero. In the illustrated embodiment of the converter controls, $V_c$ is an analog signal, and its magnitude can vary between 0 and +10 volts with respect to the predetermined reference potential. Preferably the reference potential is the same as that of a grounded conductor or bus in the d-c control power circuit.

As is shown in FIG. 2, additional inputs to the firing reference generator 65 are provided by the current call signal I* on line 55, the speed feedback signal S on line 28, the low current signal IL on line 35, and the low and high speed threshold signals SL and SH on lines 30 and 31, respectively. In a manner that is explained in more detail in connection with the description of FIGS. 3 and 4, the firing reference generator 65 generates first, second, third, and fourth reference signals on four output lines 71, 72, 73, and 74, respectively. The first reference signal on line 71 will determine the ignition angle ($\alpha_1$) of the thyristor leg of bridge 1, and normally it is variable from 0 to +10 volts as $V_c$ varies over a first predetermined range of values extending from a first or low limit (e.g., 0 volts) to a preselected first intermediate value (e.g., 3.33 volts). The second reference signal on line 72 will determine the ignition angle ($\alpha_2$) of the thyristor leg of bridge 2, and normally it is variable from 0 to +10 volts as $V_c$ varies over a second predetermined range of values extending from approximately the aforesaid first intermediate value to a preselected second intermediate value (e.g., 6.67 volts) outside of the aforesaid first range. The third reference signal on line 73 will determine the ignition angle ($\alpha_3$) of the thyristor leg of bridge 3, and normally it is variable from 0 to +10 volts as $V_c$ varies over a third predetermined range of values extending from approximately the aforesaid second intermediate value to the aforesaid upper limit (+10 volts). The fourth reference signal on line 74 determines the desired extinction angle ($\beta$) of the thyristor leg of bridge 1, and normally it varies, within predetermined limits, as a predetermined function of motor speed.

The output lines 71–74 of the firing reference generator are coupled to a block 75 labeled "firing synchronizing and pulse generator." Suitable means are provided for supplying the block 75 with signals representative of alternating voltages VB1, VB2, and VB3 applied to the bridges 1, 2, and 3, respectively, and with a signal representative of the voltage V4 across the commutating capacitor 54 in the forced commutation subcircuit 4 that is associated with the thyristor leg of bridge 1. The current feedback signal I on line 33 provides an additional input to the block 75. In a manner that is explained in more detail in conjuction with the description of FIGS. 5 and 6, the firing synchronizing and pulse generator is normally operative to generate first, second, and third sets of periodic firing signals or gate pulses for respectively turning on the pairs of main thyristors in the bridges 1, 2, and 3 in synchronism with the applied voltages at ignition angles that can be advanced or retarded as desired. More particularly, the ignition angle at which the firing signals for bridge 1 are nominally generated will vary from fully retarded to fully advanced as the first reference signal on line 71 varies from 0 to +10 volts, the ignition angle at which the firing signals for bridge 2 are nominally generated will vary from fully retarded to fully advanced as the second reference signal on line 72 varies from 0 to +10 volts, and the ignition angle at which the firing signals for bridge 3 are nominally generated will vary from fully retarded to fully advanced as the third reference signal on line 73 varies from 0 to +10 volts. Thus the three bridges are controlled in sequence. As the control signal $V_c$ increases from its first limit to its upper limit, the average magnitude of the converter output voltage is increased in three stages. With $V_c$ increasing in the aforesaid first range of values, $\alpha_1$ decreases while $\alpha_2$ and $\alpha_3$ remain in their maximum retarded conditions, and $V_0$ equals the output voltage of bridge 1 alone. With $V_c$ increasing in the aforesaid second range, $\alpha_2$ decreases while $\alpha_3$ is fully retarded and $\alpha_1$ is nominally fully advanced, and $V_0$ equals the sum of the output voltage of bridges 1 and 2. Finally, with the value of $V_c$ increasing in the third range, $\alpha_3$ decreases while $\alpha_2$ and $\alpha_1$ are in maximum advanced conditions, and $V_0$ now equals the sum of output voltages from all three bridges.

As will be better understood from the description of FIG. 7, the firing synchronizing and pulse generator 75 is also operative to generate firing signals or gate pulses for the auxiliary controlled rectifiers in the forced commutation subcircuit 4 so that normally the main thyristors in bridge 1 are periodically turned off in synchronism with the voltage VB1 at an extinction angle determined by the magnitude of the fourth reference signal on line 74. In this manner the fundamental component of current in the transformer primary 40 is shifted to be more nearly in phase with the fundamental component of primary voltage, whereby the power factor of the locomotive propulsion system is improved.

Normal operation of the firing reference generator 65 and of the companion firing synchronizing and pulse generator 75 is sometimes prevented by the action of a block 76 labeled "derate and inhibit." Inputs to the block 75 are provided by the speed threshold signals SL and SH on lines 30 and 31, respectively, by the thyristor overcurrent signals F1, F2, and F3, and, if desired, by three transformer winding overcurrent signals T1, T2, and T3 which are received from blocks 77, 78, and 79, respectively. The blocks 77–79 represent conventional instantaneous overcurrent protective relays which are respectively coupled, by means of current transformers (not shown), to the secondary windings 41–43 of the power transformer 38, and each of them is effective to produce a signal T1, T2, or T3 in response to abnormally high transformer secondary current caused by the 102, an operational amplifier 103 having a unity gain, a line 104, and a resistor 105. Suitable means is connected to the summing point 101 for introducing a constant negative bias so that the input signal to the amplifier 93 depends on the difference between $V_c$ and a second bias signal. In FIG. 3 this bias means comprises a relatively negative d-c control power terminal 106 connected to the summing point 101 via two resistors 107 and 108 in series. The resistor 107 is shunted by a transistor switch 109. The ohmic values of the resistors 107 and 108 are respectively selected so that when the transistor 109 is turned off the second bias signal is substantially the same as K1 but when the transistor 109 is conducting the second bias signal is K2 which coincides with the aforesaid second intermediate value of $V_c$. In the illustrated embodiment K2 is +6.67 volts. The conducting state of the transistor 109 is determined by a controllable solid-state switch 110 which connects its base to a relatively positive d-c control power terminal 111 and which in turn is controlled by the second inhibit signal (INH2) on line 82. In normal operation there is a high or "1" signal on line 82, the switch 110 is closed, the transistor 109 is therefore in its conducting state, and consequently the second bias signal is 6.67 volts. However, in the event of a fault in bridge 2 a second inhibit signal is produced by the above-described derate and inhibit block 76, whereby INH2 will now be low or "0", the switch 110 is open, the transistor 109 is therefore turned off, and the second bias signal is reduced to 3.33 volts. The resulting variation of the third amplifier's output signal ($\alpha_3$ REF) on the line 73 as $V_c$ varies is shown in the graph at the bottom of the right side of FIG. 3 by a solid-line trace 89 when INH2 is high and by a broken-line trace 90 when INH2 is low. Whenever the value of $V_c$ is less than the effective bias signal, $\alpha_3$ REF is negative.

The firing reference generator includes means responsive to the production of the low and high speed threshold signals SL and SH for momentarily resetting the input signals to the second and third amplifiers 92 and 93, respectively. The resetting means associated with the second amplifier comprises a capacitor 113 connected between the line 96 and ground, a normally turned off transistor switch 114 connected across the capacitor 113, and a conventional monostable multivibrator 115 (shown in FIG. 3 as a block labeled "one shot") connected to the base of the transistor 114. The signal SL on line 30 is supplied to the input of the block 115, and any 0-to-1 change of this signal causes the output of the one shot to turn on the transistor 114 for a predetermined brief period of time (e.g., one millisecond). This discharges the capacitor 113 and reduces the signal on line 96 to zero regardless of the value of $V_c$ at the time SL changed from 0 to 1. As soon as the brief period expires, the transistor 114 returns to its normally off state and the capacitor 113 can quickly recharge. During the recharging interval the signal on line 96, and hence $\alpha_2$ REF on the output line 72 of the second amplifier 92, smoothly increases to a valued determined by $V_c$. The resetting means associated with the third amplifier 93 comprises a capacitor 116 connected between the line 104 and ground, a normally turned off transistor switch 117 across the capacitor 116, and a one shot block 118 whose output is connected to the transistor 117 and whose input is supplied by the signal SH on line 31. These components operate in the same manner as the resetting means 113-115 to ensure that following any 0-to-1 change of the signal SH, $\alpha_3$ REF on the output line 73 of the amplifier 93 will ramp up from a negative value to a value determined by $V_c$.

The firing reference generator also includes means responsive to the derate signal on line 80 to clamp the third reference signal on line 73 to a predetermined maximum level, thereby imposing the aforesaid predetermined minimum limit on the ignition angle for the main thyristors in bridge 3. The maximum level of the reference signal on the output line 73 of the third amplifier 93 is established by means of a pair of resistors 120 and 121 connected in series with one another between the positive control power terminal 111 and ground. An amplifier 122 with the same gain as amplifier 93 has an input connected by a line 123 to the junction of these resistors and an output connected via a diode 124 to the line 73. The diode 124 is polled to prevent the value of the third reference signal on line 73 from being more positive than a maximum level which is determined by the fixed potential on the line 123. So long as the value of the third reference signal is not more positive than this maximum level, the diode 124 will be reverse biased and the clamping means is ineffective. A normally open solid-state switch 125 is connected in series with the resistor 121, whereby normally there is no current in resistor 120 and the potential on line 123 equals the high positive potential of the terminal 111.

The switch 125 is controlled by the signal on line 80 to which it is coupled through a signal inverter 126. In normal operation there is a high or "1" signal on line 80 and the switch 125 is open. However, in the event of a fault in either bridge 1 or bridge 2 a derate signal is produced by the above-described derate and inhibit block 76, and the resulting low or "0" signal on line 80 is inverted to a 1 which closes the switch 125. This causes the potential on line 123 to fall to the proper level to prevent $\alpha_3$ from becoming smaller than the desired minimum angle. The minimum angle is larger than approximately 50 electrical degrees, and preferably it is of the order of 70 to 75 degrees so that under derate conditions the load on the third secondary winding 43 of the power transformer 38 is limited to approximately 65 percent of maximum. The corresponding maximum level of $\alpha_3$ REF is shown by the horizontal part 90a of the trace 90 in the bottom graph of FIG. 3.

Means similar in construction and operation to the above-described clamping means 120-125 is connected to the output line 71 of the first amplifier 91 in FIG. 3. It comprises resistors 130 and 131, operational amplifier 132, line 133, diode 134, and solid-state switch 135. In this case, however, the switch 135 of the clamping means is controlled by a signal on the output line 136 of a conventional AND logic circuit 137 shown symbolically as an encircled dot having two inputs. The circuit 137 will produce an output signal that is high or 1 only when all of its inputs concurrently are 1; otherwise its output is low or 0. One input of circuit 137 is connected to the line 35 on which the low current signal IL is provided. IL is 1 except when the magnitude of motor current is lower than the aforesaid predetermined low level. The other input is connected to the line 70 which in turn is connected in the firing synchronizing and pulse generator 75 to a $\beta$ logic circuit which provides a signal ($\beta$OK) on this line that is 1 only when the generator 75 is not generating firing signals for periodically turning on the auxiliary controlled rectifiers in the forced commutation subcircuit 4 of bridge 1. If and when the output signal of the AND circuit 137 is 1, the switch 135 is closed and the value of the first reference signal on line 71 is prevented from becoming more positive than a predetermined maximum level corresponding to the aforesaid predetermined minimum limit of $\alpha_1$ (e.g., 73 degrees). Preferably, as is shown by the horizontal broken-line trace 87a in the top graph of FIG. 3, this maximum level of $\alpha_1$ REF is approximately +6 volts which is attained when $V_c$ increases to approximately 2 volts. Once the forced commutation subcircuit 4 is operating normally to turn off the main thyristors in bridge 1 ($\beta$ OK=0), or whenever motor current is lower than its predetermined low level (IL=0), the output of the AND circuit 137 will be 0, the switch 135 is open, the clamping means 130-135 is disabled, $\alpha_1$ REF can rise above the maximum level 87a, and $\alpha_1$ can correspondingly decrease from its predetermined minimum angle until it attains a maximum advance condition. For reasons that will be understood after reading the descriptions of FIGS. 4 and 9, $V_c$ will exceed 3.33 volts at the time $\beta$ OK changes from 1 to 0 during normal low-speed acceleration of the locomotive with the throttle 57 in notch 8. Therefore at that time there is a step increase in $\alpha_1$ REF from the maximum limit 87a to +10 volts (indicated by the broken-line part 87b of the trace 87 in the top graph of FIG. 3), and there is a correspondingly abrupt decrease in $\alpha_1$ to its maximum advanced condition.

Figure 4:
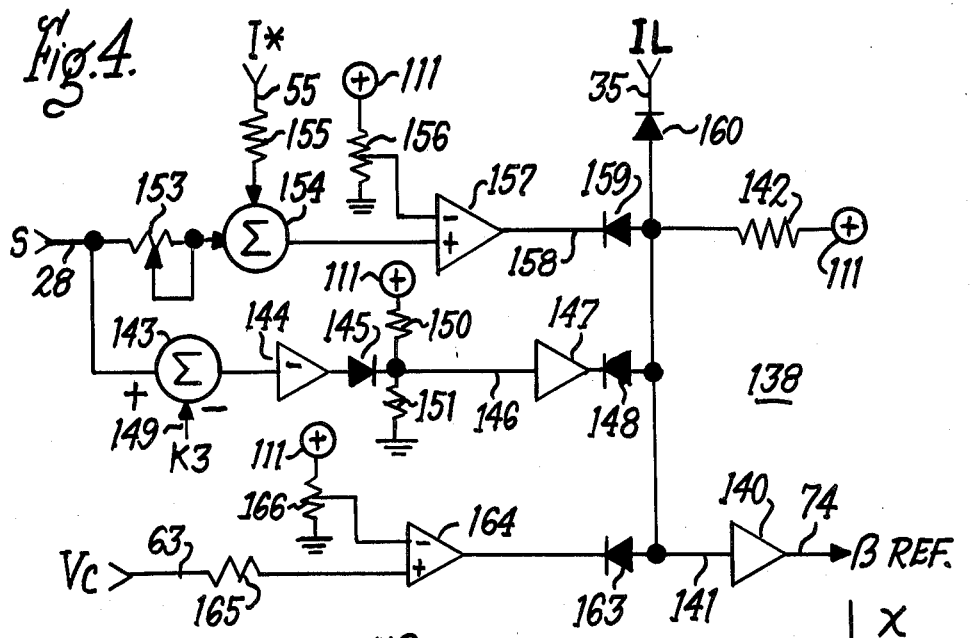
FIG. 4 is a schematic circuit diagram of the block labeled "REFERENCE" in FIG. 3.

In the firing reference generator 65 as it is illustrated in FIG. 3, the motor speed feedback signal S on the line 28 is fed to an input of a block 138 labeled "$\beta$ reference," and the fourth reference signal ($\beta$ REF) on the line 74 is developed at the output of this block. It is the value of the latter signal that determines the desired firing angle of the auxiliary controlled rectifiers in the forced commutation subcircuit 4 and hence the extinction angle $\beta$ of the main thyristor leg of bridge 1. When $\beta$ REF is zero or has a negative value, no firing signals are generated for the auxiliary rectifiers in subcircuit 4. But when $\beta$ REF has a finite positive magnitude, $\beta$ varies inversely therewith. FIG. 4 shows the presently preferred embodiment of the $\beta$ reference circuit 138 and will now be described.

As can be seen in FIG. 4, the signal on line 74 is actually the output signal of an operational amplifier 140 whose input is connected to a line 141 having five different branches. One branch comprises a resistor 142 connected to a relatively positive d-c control power terminal 111. A second branch comprises the series combination of the line 28, a summing point 143, an inverting amplifier 144, a diode 145, a line 146, an amplifier 147, and a blocking diode 148. In this branch the speed feedback signal S on line 28 is supplied as a first input to the summing point 143, and suitable means (not shown) is connected to another input line 149 of the same summing point for subtracting a preselected constant bias signal K3 from S. A signal having a value proportional to the difference between S and K3 is inverted at 144 and supplied to the line 146 which is connected to the input of the amplifier 147. The line 146 is also connected to the junction between two resistors 150 and 151 that are serially connected between a positive control power terminal 111 and ground so as to establish a predetermined minimum positive level for the signal on line 146. So long as motor speed is less than a predetermined threshold, the inverted difference signal (K3-S) has a value more positive than the just-mentioned minimum level, the diode 145 is conducting, and the actual value of the signal on line 146 is directly proportional to K3-S and hence inversely proportional to speed. But whenever motor speed equals or exceeds its predetermined threshold, the value of K3-S will be less than the minimum positive level, and the diode 145 will consequently be reverse biased.

The amplifier 147 amplifies the signal on line 146, and its output signal is supplied via the diode 148 to the input line 141 of the op amp 140. The output signal of the amplifier 147 will determine the value of $\beta$ REF on the output line 74 of the illustrated $\beta$ reference circuit 138, provided that associated disabling means (which are described below) are not effective. The ohmic values of the respective resistors 150 and 151 are chosen so as to prevent the value of the signal on line 146 from being less positive than a level that normally results in a predetermined minimum value of $\beta$ REF. This minimum value corresponds to a predetermined maximum limit of $\beta$. In the illustrated embodiment of the invention, $\beta$ is clamped at approximately 95 degrees ($\beta$ MAX=95°) when motor speed is higher then the aforesaid predetermined threshold. If the power transformer 38 has relatively poor regulation, whereby the amplitudes of V1, V2 and V3 are lower than usual, a larger $\beta$ MAX (e.g., 110°) is desirable because it enables bridge 1 to contribute more output voltage which has the effect of extending the high power factor range of locomotive operation to a motor speed significantly higher than the aforesaid high threshold at which the signal SH changes from 0 to 1. In any event, the maximum limit ensures that, so long as the magnitude of motor current is not too low, sufficient time is available (from $t_2$ to the end of the half cycle of V1 shown in FIG. 8) for the commutating capacitor 54 to be discharged and adequately recharged after a main thyristor turns off in bridge 1. The bias signal K3 is preferably selected so that the predetermined threshold of motor speed (i.e., the speed at which diode 145 stops conducting) is approximately 0.18 per unit.

The other three branches of the line 141 are connected to various disabling means which, when effective, override the output signal of the amplifier 147 and clamp the signal on line 141 to 0. The amplifier 140 is so arranged that $\beta$ REF will have a slightly negative magnitude whenever there is a substantially zero signal on its input line 141. In this event there are no periodic firing signals supplied to the auxiliary rectifiers T4a and T4b associated with bridge 1, and the forced commutation subcircuit 4 is disabled. Forced commutation is "brought on" by unclamping the signal on line 141 and enabling it to rise above 0.

The first disabling means in the $\beta$ REF circuit 138 is effective to clamp the signal on line 141 to 0 whenever motor speed is lower than a preselected minimum which is dependent on the command signal (i.e., the setting of the locomotive throttle 57). In the embodiment of the invention that is illustrated in FIG. 4, the command signal is deduced from the speed feedback signal S on line 28 and the current call signal I* on line 55. For this purpose S is fed through an adjustable scaling resistor 153 to one input of a summing point 154, I* is fed through a fixed resistor 155 to the other input of this point, and the magnitude of the variable output signal from the summing point 154 is compared with a preselected constant reference provided by a potentiometer 156 which spans the terminal 111 and ground. The comparison is done by a comparator 157 which is connected, via an output line 158 and a blocking diode 159, to the line 141. If the summing point output is less than a critical magnitude equal to the constant reference, the output of the comparator 157 is negative or 0, the diode 159 is conducting, and the signal on line 141 cannot rise appreciably above zero. But whenever the summing point output equals or exceeds this critical magnitude, the comparator output on line 158 is high or 1, the diode 159 is reverse biased, and this disabling means is ineffective.

The particular speed required for the output of the summing point 154 to attain the critical magnitude that causes the signal on line 158 to change from 0 to 1 will depend on the current call signal I* which in turn depends on both command signal and motor speed. The potentiometer 156 is set so that the speed at which the signal on line 158 becomes 1 and hence forced commutation is brought on will be higher than a speed at which the counter emf of the motors exceeds the average magnitude of the output voltage of bridge 1 alone when $\alpha_1$ is clamped at its aforesaid minimum angle. In one practical embodiment of the invention, the minimum speed was selected to be approximately 0.10 per unit in notch 8. Note that this speed is greater than the aforesaid low threshold (e.g., 0.07 per unit) at which the signal SL changes from 0 to 1 and the signal INH2 on line 82 consequently changes from 1 to 0 (assuming neither bridge 1 nor bridge 2 is faulted). As the command signal is lowered from notch 8, I* decreases and the minimum speed will increase. For example, in notch 6 the required minimum speed is higher than 0.18 per unit. The minimum speed in notch 3 may be slightly higher than the corner point speed, but it is less than the aforesaid high threshold (e.g., 0.40 per unit) at which the signal SH changes from 0 to 1 and the third inhibit signal on line 83 consequently changes from 1 to 0 (assuming there is no fault in bridge 1, 2, or 3). This feature of the invention assures that when the locomotive is accelerating from rest $\beta$ REF remains zero or slightly negative (and therefore the normal operation of the forced commutation subcircuit 4 is disabled) until after the speed has increased sufficiently to require output voltage from both of the bridges 1 and 2 in order to supply the desired motor current. Consequently, when motor speed attains its preselected minimum that enables $\beta$ REF to rise to a positive magnitude that permits normal operation of the forced commutation subcircuit, the net output voltage of the converter will comprise contributions from both bridge 1 and bridge 2, and the fundamental component of transformer primary current will now be nearly in phase with the fundamental component of primary voltage. If bridge 2 were not contributing output voltage while the main thyristors in bridge 1 are being forced commutated, the locomotive propulsion system would exhibit an undesired leading power factor.

The second disabling means comprises a blocking diode 160 connected between the line 141 and the line 35. The signal IL on line 35 is 0 whenever the magnitude of motor current is lower than the aforesaid predetermined low level, and otherwise it is 1. The diode 160 is conducting, and hence this disabling means is effective to clamp the signal on line 141 to 0, only when IL=0. This feature of the invention avoids any misoperation of the forced commutation subcircuit 4 when current is too low to discharge the commutating capacitor 54 and to recharge it adequately during the available time. The charging rate of the commutating capacitor varies with current magnitude. In FIG. 8 the trace 161 represents capacitor voltage when motor current has a relatively low magnitude. This voltage does not attain the magnitude of V1 until time $t_{5'}$ which is much later in the illustrated half cycle than $t_5$. At this time the instantaneous magnitude of V1 may be so low that the capacitor voltage will not rise above a critical minimum level required to successfully commutate a main thyristor in bridge 1 during the next half cycle. Such a possibility is prevented by disabling the forced commutation subcircuit whenever IL=0 and by clamping $\beta$ at the aforesaid maximum limit when normal operation is permitted. In one practical embodiment of the invention the predetermined low level of motor current was selected to be 400 amps.

The third disabling means comprises a blocking diode 163 connected between line 141 and the output of a comparator 164. The comparator 164 has a positive input that is supplied with the control signal on line 63 to which it is connected via a resistor 165, and it has a negative input that is supplied with a preselected constant reference from a potentiometer 166 which spans the positive control power terminal 111 and ground. If the value of $V_c$ is between zero and a critical value determined by the constant reference, the output of the comparator 164 is negative or 0, the diode 163 is conducting, and hence the third disabling means is effective to clamp the signal on line 141 to 0. But whenever $V_c$ equals or exceeds its critical value, the comparator output is 1 and this disabling means is not effective. The potentiometer 166 is set so that the critical value of $V_c$ is the same as the value of $V_c$ at which the first reference signal ($\alpha_1$ REF) on line 71 has a certain magnitude (marked at 167 in the top graph of FIG. 3) which corresponds to a certain ignition angle that is smaller than the aforesaid maximum limit of $\beta$ but not smaller than the aforesaid predetermined minimum angle of $\alpha_1$. Consequently, in normal operation the forced commutation subcircuit 4 will be disabled whenever $\alpha_1$ is more retarded than this certain angle which preferably is approximately midway between $\beta$ MAX and the predetermined minimum angle of $\alpha_1$. This feature of the invention ensures that the firing signals for the auxiliary controlled rectifiers in the subcircuit 4 remain properly coordinated with the first set of firing signals for the main thyristors in bridge 1 when the locomotive traverses a phase break in the catenary 47 at a high speed. It is customary temporarily to reduce I* to zero in response to such a traverse, whereby $V_c=0$ and the ignition angles of all three rectifying bridges will be fully retarded (no output voltage) when the locomotive pantograph 46 makes contact with an energized section of the catenary following the phase break. Thereafter, as $V_c$ increases from 0 and as $\alpha_1$ is correspondingly advanced in an orderly fashion, the third disabling means is effective to prevent any generation of firing signals for the auxliary rectifiers in subcircuit 4 until $\alpha_1$ is less than $\beta$ MAX.

Figure 4A:
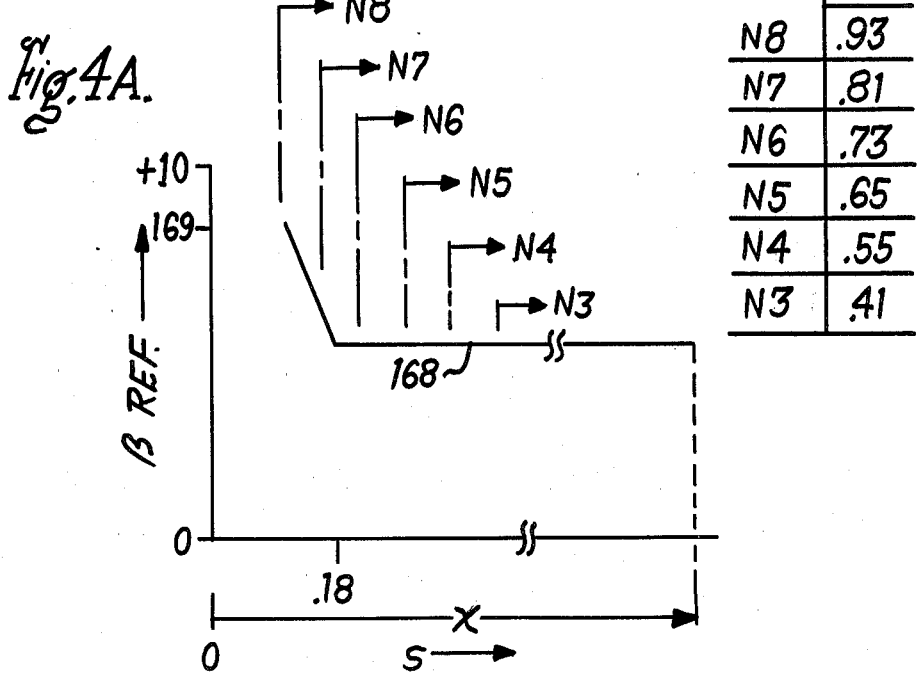
FIG. 4A is a graph showing the β REF. vs. motor speed characteristics of the FIG. 4 β reference circuit for various settings of the locomotive throttle.

The manner in which the output signal ($\beta$ REF) of the above-described $\beta$ reference circuit 138 varies as a function of motor speed (S) is generally shown by a trace 168 in FIG. 4A. In this figure the designations N8, N7, etc. refer to different given values of the command signal; N8 is the maximum or notch 8 setting of the locomotive throttle, N7 is the next lower setting, etc. Assuming that S is increasing from 0 and the $V_c$ is above its critical value so that the third disabling means is not effective, as soon as speed attains its preselected minimum (e.g., approximately 0.10 per unit for N8 but higher if the given command signal is lower) the first disabling means permits $\beta$ REF to increase abruptly from 0 to an initial positive level determined by the minimum speed, and $\beta$ REF will then decrease (and hence $\beta$ will increase) as speed increases up to the threshold (e.g., 0.18 per unit) at which $\beta$ REF is clamped at its aforesaid minimum value (corresponding to $\beta$ MAX). The initial level of $\beta$ REF is marked at 169 in FIG. 4A for N8; it corresponds to a $\beta$ of approximately 32°. The initial level is lower than 169 for N7 and is the same as the minimum value of $\beta$ REF when the given command is N6 or lower. $\beta$ REF remains at its minimum value until a speed of X is attained, whereupon it abruptly decreases to 0. X is the speed at which motor current decreases to such a low level that signal IL changes from 1 to 0, thereby making the second disabling means effective. By way of example, X is 0.93 per unit for N8, and, as is indicated in the table at the right side of FIG. 4A, it is lower if the given command signal is lower.

The signals on the respective output lines 71–74 of the firing reference generator 65 are fed to the firing synchronizing and pulse generator 75. As is shown in FIG. 5, the latter generator actually comprises three separate synchronizing and gate pulse generators 171, 172 and 173 which, at ignition angles $\alpha_1, \alpha_2$ and $\alpha_3$ that are respectively determined by the values of the first, second and third reference signals on line 71, 72 and 73, generate the first, second, and third sets of periodic firing signals that are coupled to the gates of the main thyristors T p and T n in the bridges 1, 2 and 3, respectively. It also comprises a block 174 labeled "$\beta$ logic" that is fed by the fourth reference signal ($\beta$ REF) on line 74 and that is interconnected with the #1 generator 171. The block 174 is suitably constructed and arranged to produce periodic trigger signals which are fed over a line 175 to a block 176 labeled "#4 GPG." In response to the trigger signals on line 175 and to steering signals received from "enable" 1 and 2 outputs of the generator 171, the block 176 generates firing signals that are coupled to the gates of the auxiliary controlled rectifers T4$a$ and T4$b$ in the forced commutation subcircuit, which signals in effect are turn off signals for the pair of main thyristors in bridge 1. Circuit details of the presently preferred embodiment of the #1 synchronizing and gate pulse generator 171 are shown in FIG. 6, and circuit details of the presently preferred embodiment of the $\beta$ logic block 174 are shown in FIG. 7.

As can be seen in FIG. 6, one input of the #1 generator 171 is supplied with the signal $\alpha_1$ REF on line 71, and another input receives a signal VB1 representative of the alternating voltage applied to bridge 1 (i.e., the voltage between the respective junctures of the diodes D1$p$ and D1$n$ and of the main thyristors T1$p$ and T1$n$). The latter signal energizes the primary of a single-phase instrument transformer 178 having a center-tapped secondary winding 179 which is connected to bistable voltage detecting means 180 and which is also connected to squaring means comprising two blocks 182 and 183 which are respectively labeled "square pos." and "square neg." The purpose of the voltage detecting means 180 is to indicate when VB1 is zero; it has a "0" output state whenever the magnitude of VB1 is negligible and a "1" output state whenever the magnitude of VB1 is appreciable. More specifically, the signal "volt zero" on the output line 181 of the detector 180 is 1 only if and when the instantaneous magnitude of the alternating voltage applied to bridge 1 equals or exceeds a predetermined low level. Preferably this "pick up" level of the detector 180 is approximately 25 percent of the peak magnitude of V1 under a full voltage condition when the locomotive is adjacent to a wayside substation.

During each "positive" half cycle of VB1 the squaring means is operative to produce a "1" digital logic signal 184 at the output of the block 182, and during each "negative" half cycle of VB1 a "1" signal 185 is produced at the output of the block 183. The squared signals 184 and 185 are supplied to a zero crossing logic circuit 186 which is suitably constructed and arranged to produce, on its output line 187, a train of synchronizing signals or sync pulses 188 that are "1" for relatively short, constant periods of time precisely coinciding with successive zero crossings of VB1. The signals 184, 185, and 188 are supplied to inputs of a block 190 labeled "enable," which block has two output lines 191 and 192. The purpose of this component is to correct any asymmetry that may exist in the squared signals 184 and 185. It is suitably constructed and arranged to provide a "1" steering or enable signal on line 191 that is concurrent with each positive half cycle of VB1 and alternately to provide a "1" steering or enable signal on line 192 that is concurrent with each negative half cycle of VB1.

The circuits illustrated in FIG. 6 also include suitable means responsive to the sync pulses 188 on line 187 for providing a timing signal that is coordinated with the zero crossings of VB1. Preferably the timing signal is provided by a conventional saw-tooth generator 193 connected between a relatively positive d-c control power terminal 111 and ground. This component generates a saw-tooth voltage wave in synchronism with VB1. More particularly, the output of the generator 193 is an analog signal 194 the value of which increases abruptly to +10 volts in response to each sync pulse and then decreases at a constant rate that results in the signal 194 falling from +10 volts to 0 in a half period of VB1. The saw-tooth voltage signal 194 is fed via the output line 195 of the generator 193 to the negative input of a comparator 196 whose positive input comprises the signal $_1$ REF on line 71. Consequently the signal on the output line 197 of the comparator 196 will change from 1 to 0 when the saw-tooth signal rises to +10 volts at the start of each half cycle, and subsequently it will change from 0 to 1 each time a falling saw-tooth signal intersects the first reference signal, i.e., at the instant when the value of the saw-tooth signal just equals the value of the reference signal. So long as the first reference signal on line 71 is positive, the lower its magnitude the later the signal on line 197 changes from 0 to 1 in each half cycle of BV1. As the reference signal approaches 0, the 0-to-1 change on line 197 occurs at an electrical angle approaching 180 degrees. If the reference signal were negative, the signal on line 197 would remain 0.

The output line 197 from the comparator 196 is coupled to the input line 198 of a monostable multivibrator 199 (which is shown as a block labeled "one shot") by way of suitable AND logic means 200 (shown symbolically in FIG. 6 by an encircled dot having four inputs). The one shot block 199 is operative in response to each 0-to-1 change of the signal on its input line to produce at its output a brief "1" signal or $\alpha$ trigger pulse of fixed duration (e.g., 15 microseconds). Consecutive trigger pulses from the block 199 will alternately activate a pair of gate pulse generators 201 and 202, depending on which one of these generators is "enabled" by a steering signal from the enable block 190. Throughout a positive half cycle of VB1, the "1" signal on line 191 is supplied to one input of an AND logic circuit 203 which therefore passes the trigger pulse from the one shot 199 to the first gate pulse generator 201, whereas throughout a negative half cycle of VB1, the "1" signal on line 192 is supplied to one input of another AND logic circuit 204 which therefore passes the trigger pulse from the one shot 199 to the second gate pulse generator 202. When the generator 201 is activated by an $\alpha$ trigger pulse, it transmits an appropriate firing signal to the gate electrode and cathode of the main thyristor T1$p$ in bridge 1, and when the generator 202 is activated by the next $\alpha$ trigger pulse, it will transmit an appropriate firing signal to the gate electrode and cathode of the main thyristor T1$n$ in bridge 1. Thus the #1 generator 171 nominally generates the first set of firing signals at an ignition angle $\alpha_1$ which coincides with the angle (measured in electrical degrees from the start of each half cycle of VB1) of the 0-to-1 change of the comparator output signal on line 197.

The trigger pulses produced at the output of the one shot 199 are also fed to a "set" input of a conventional bistable flip flop device 205. This device has a "reset" input connected to the sync pulse line 187 and a "Q" output connected to an output line 206, whereby a 1 signal (referred to as "old $\alpha$") is provided on the line 206 except during recurrent intervals that commence at each zero crossing of VB1, as indicated by a sync pulse 188 on line 187, and that terminate with the next generation of an $\alpha_1$ firing signal. The output line 206 is connected to the $\beta$ logic circuit 174 where, in a manner that will soon be explained in conjunction with the description of FIG. 7, a 0 signal on this line is effective to prevent any production of a $\beta$ trigger signal on line 175 prior to an $\alpha$ trigger pulse being produced by the one shot 199 during each half cycle of VB1.

The AND logic means 200 will prevent the one shot device 199 from responding normally to a 0-to-1 change of the comparator output signal on line 197 if any one of the signals supplied to its various inputs is 0. So long as any 0 signal is being supplied to the logic means 200, the signal on line 198 will remain 0 and the device 199 cannot produce any $\alpha_1$ trigger pulse. This inhibits the first set of firing signals and consequently blocks the thyristor turn on operation of the #1 generator 171. As is shown in FIG. 6, one of the input signals to the logic means 200 comprises the first inhibit signal (INH1) on line 81. In normal operation INH1 is 1, but it will change to 0 when the derate and inhibit block 76 (FIG. 2) detects a bridge 1 fault, in which event normal operation of the one shot 199 will be prevented.

Another input to the logic means 200 comprises the volt zero signal on line 181. This signal is 0 whenever the instantaneous magnitude of alternating voltage applied to bridge 1 is lower than the aforesaid predetermined low level, as is true if the power transformer primary winding 40 is deenergized (e.g., when the pantograph 46 of the locomotive is traversing a phase break in the catenary 47), during commutation notches (i.e., during the commutation interval following the firing of each of the main thyristors in bridge 1), and immediately before and after each zero crossing of VB1. It will now be apparent that the selection of the pickup level of the zero voltage detector 180 determines minimum and maximum limits of $\alpha_1$ when $\alpha_1$ REF is near 0 volts or +10 volts. For example, assuming that the pickup level is 25 percent of the peak magnitude of V1 at full line voltage, the $\alpha_1$ firing signals cannot be actually generated at an ignition angle more advanced than approximately 15° or more retarded than approximately 165°. Such limits are desirable because they prevent any attempt to fire a main thyristor when the magnitude of its annode-to-cathode voltage is too low to ensure successful turn on.

Yet another input to the logic means 200 is provided over a line 207 from the output of a companion AND logic circuit 208 having two input lines 209 and 210. The signal on line 207 is 1 whenever the signals on both lines 209 and 210 are concurrently 1, and otherwise it is 0. The line 209 is connected to the logic circuit 174 (FIG. 7) where it receives a 0 signal only during recurrent intervals that commence with the generation of a $\beta$ firing signal during each positive or negative half cycle of VB1 and that terminate at the end of the half cycle. The line 210 is connected to a block 211 (labeled "brake" in FIG. 6) which normally produces a 1 output signal but which is suitably constructed and arranged to change its output signal to 0 when the locomotive is operating in a braking mode rather than a motoring mode.

The #2 and #3 synchronizing and gate pulse generators 172 and 173 are constructed similarly to and operate in essentially the same manner as the #1 generator 171 just described with reference to FIG. 6. However, they do not use the flip flop 205, the logic circuit 208, the lines 209 and 210, and the block 211. The input signals VB1, $\alpha_1$ REF, and INH1 are replaced in the #2 generator 172 by VB2, $\alpha_2$ REF, and INH2, respectively, and in the #3 generator 173 by VB3, $\alpha_3$ REF, and the third inhibit signal (INH3) on line 83, respectively.

Assuming there is no bridge fault, the signal INH2 will change from 0 to 1 contemporaneously with the low speed signal SL changing from 0 to 1 when motor speed attains the aforesaid low threshold. At the same time the resetting means 113-115 in the firing reference generator 65 (FIG. 3) operates momentarily to reduce the second reference signal ($\alpha_2$ REF) to a negative magnitude regardless of the value of the control signal $V_c$. Subsequently $\alpha_2$ REF is permitted to increase smoothly to a positive magnitude determined by $V_c$. If $V_c$ is then more than K1, as soon as INH2 changes from 0 to 1 during low speed acceleration of the locomotive (which change enables the #2 generator 172 to start generating firing signals for the main thyristors in bridge 2), $\alpha_2$ begins an orderly advance from a maximum retarded condition to the angle determined by $V_c$. This ensures that the average magnitude of the output voltage of bridge 2 will increase gradually rather than abruptly when this bridge is initially "turned on." The signal INH3 will change from 0 to 1 contemporaneously with the high speed signal SH changing from 0 to 1 when motor speed attains the aforesaid high threshold, and at the same time the resetting means 116-118 in the firing reference generator 65 (FIG. 3) operates momentarily to reduce $\alpha_3$ REF to a negative magnitude. Thereafter, in the same manner as described above, if $V_c$ is more than K2 $\alpha_3$ REF will smoothly increase so that $\alpha_3$ advances in an orderly fashion from maximum retard to the angle determined by $V_c$. This ensures that when bridge 3 is initially "turned on" its output voltage will increase smoothly.

As is shown in FIG. 5, the #1 synchronizing and gate pulse generator 171 (FIG. 6) is interconnected with the $\beta$ logic circuit 174. The latter circuit will now be described with reference to FIG. 7. It includes a comparator 215 having two inputs. The saw-tooth voltage signal (194) from the #1 generator 171 is fed via line 195 to the negative input of this comparator, and the signal β REF on line 74 from the β reference circuit 138 in the firing reference generator 65 is fed to the positive input of the comparator 215. Consequently the signal on the output line 216 of the comparator will change from 0 to 1 each time a falling saw tooth signal on line 195 intersects a reference signal of positive magnitude on line 74. The line 216 is coupled to the input line 217 of a monostable multivibrator (one shot) 218 via AND logic means 220 shown symbolically in FIG. 7 by an encircled dot having multiple inputs. The output of the one shot device 218 appears on the output line 175 of the β logic circuit and this device is operative periodically, in response to successive 0-to-1 changes of the signal on its input line 217, to produce a train of discrete β trigger signals on the line 175. These trigger signals are supplied to the #4 gate pulse generator 176 (FIG. 5) which comprises suitable means, including logic circuits similar to those shown at 203 and 204 in FIG. 6, for alternately transmitting appropriate firing signals to the respective auxiliary controlled rectifiers in the forced commutation subcircuit 4 in response to consecutive signals on line 175. As a result, the turn off action of each of the main thyristors T1p and T1n in bridge 1 is initiated at an extinction angle β that nominally coincides with the "angle" of the 0-to-1 change of the comparator output signal on line 216. It will now be apparent that the lower the value of β REF the later this change occurs in each half cycle of applied voltage (VB1), and hence β varies inversely with the value of β REF.

The trigger signals on output line 175 are also fed to a "set" input of a flip flop device 221 which has a "reset" input connected to the sync pulse line 187 and a "Q bar" output connected to the line 209. The output signal of this device is 1 except during the aforesaid recurring intervals commencing with the production of each β trigger signal and terminating at the next sync pulse (188) on line 187 (which marks the end of either a positive or negative half cycle of the alternating voltage applied to bridge 1). The line 209 is coupled in the #1 generator (FIG. 6) to the input line 207 of the logic means 200, and once a β trigger signal is produced on line 175 the resulting 0 signal on line 209 is effective to inhibit another α₁ firing signal until the next half cycle.

The AND logic means 220 will prevent the one shot device 218 from responding normally to a 0-to-1 change of the comparator output signal on line 216 if any one of the signals supplied to its various inputs is 0. So long as any 0 signal is being supplied to the logic means 220, the signal on line 217 will remain 0 and the device 218 cannot produce any β trigger signals on line 175. This inhibits the firing signals for the auxiliary rectifiers in the forced commutation subcircuit 4 and consequently blocks the thyristor turn off operation of the converter controls.

One of the input signals supplied to the logic means 220 comprises the inverted output signal of a conventional OR logic circuit 223 shown symbolically in FIG. 7 by an encircled plus sign. The output of this circuit is connected to an input of the logic means 220 via a signal inverter 224 and a line 225. The signal on line 225 is 0 so long as there is a 1 signal on either of the two input lines 226 and 227 of the circuit 223, and it is 1 only when the signals on both input lines are concurrently 0. The first input line 226 is supplied with the inverted output signal of an AND logic circuit 228 to which it is connected via a signal inverter 229. The two inputs of the latter circuit are connected to the lines 80 and 206, respectively. The output signal of the logic circuit 228 will be 0 (and the signal on line 226 will therefore be 1) so long as there is a 0 signal on either line 80 or line 206; otherwise it is 1. As a result, a 0 signal is maintained on the input line 225 of the logic means 220 and normal operation of the one shot 218 is prevented whenever the derate signal on line 80 is 0 (as is the case when the derate and inhibit block 76 detects a fault in either bridge 1 or bridge 2) or whenever the old α signal on line 206 is 0 (as is true during the aforesaid recurrent intervals commencing at the start of each half cycle of the alternating voltage applied to the a-c terminals of bridge 1 and terminating in response to the next turn on of thyristor T1p or T1n in the same bridge).

The second input line 227 to the OR logic circuit 223 is supplied with the output signal of a companion OR logic circuit 230 having two input lines 231 and 232. As can be seen in FIG. 7, line 231 is connected to the output of a block 233 labeled "low com volts" which in turn receives as inputs the current feedback signal I on line 33, a signal representative of the voltage V4 across the commutating capacitor 54, and the enable 1 and 2 signals on lines 191 and 192, respectively. The purpose of the component 233 is to block or inhibit the normal thyristor turn off operation of the β logic circuit 174 by providing a 1 signal on line 231 (and hence a 0 signal on line 225) anytime the magnitude of V4 is insufficient to ensure successful forced commutation of the load current being conducted by the main thyristors in bridge 1. The circuit details, operation, and advantages of such a component are disclosed and claimed in a copending patent application Ser. No. 454,207 filed on Dec. 29, 1982 of H. J. Brown, A. K. Kumar, and E. S. Matulevich and assigned to General Electric Company.

The second input line 232 to the OR logic circuit 230 is connected to the output of a time delay circuit 235 which in turn receives as inputs the volt zero signal on line 181, the sync pulses (188) on line 187, and the inverted old α signal on line 226. The circuit 235 is operative when the main thyristors in bridge 1 are fired to provide a 1 signal on line 232 (and hence a 0 signal on line 225) so as temporarily to extend the aforesaid recurrent intervals during which normal thyristor turn off operation of the β logic circuit is blocked, whereby each of the diodes D1p and D1n in bridge 1 has sufficient time to fully recover its reverse blocking capability after load current is commutated to the corresponding main thyristor before the complementary auxiliary rectifier can be fired. This feature of the β logic circuit is the claimed subject matter of a patent application Ser. No. 429,729 filed concurrently herewith in the names of H. J. Brown, I. N. Horvat, and A. K. Kumar and assigned to General Electric Company.

Preferably, as is shown in FIG. 7, the time delay circuit 235 comprises the combination of a D-type flip flop 236 and a "one shot" device 237. The signal on line 181 is supplied to the input of the one shot 237 and also, via an OR logic circuit 238, to the "D" input of the flip flop 236. The "Q" output of the flip flop is fed back through 238 to the D input. The output of the device 237 is connected to the "clock" input of the flip flop 236 via a signal inverter 239 and a line 240. The one shot device 237 has a "clear" input which is connected to the line 226. In its quiescent state, this device has a low or 0 output and the signal on line 240 is 1. Assuming there is a 0 signal on line 226, each 0-to-1 change of the volt zero signal on line 181 activates or triggers the one shot which then produces a high or 1 output signal (inverted to a 0 signal on line 240) for a predetermined period of time (e.g., 300 microseconds). If there is a 1 signal on line 226, the one shot cannot be activated and its output will remain 0.

The output signal of the time delay circuit 235 is the "Q bar" output of the flip flop 236. It changes from 0 to 1 at each zero crossing of the alternating voltage applied to bridge 1, as indicated by a sync pulse on line 187 to which the "reset" input of 236 is connected, and it later changes from 1 to 0 whenever the signal on the clock input line 240 changes from 0 to 1 while a 1 signal is being applied to the D input of the flip flop. The signal on line 240 changes from 0 to 1 simultaneously with a 1-to-0 change at the output of the one shot 237. This occurs on the expiration of the aforesaid time period after the one shot has been triggered in response to the signal on line 181 changing from 0 to 1 while the signal on the line 226 is 0. There is a 0-to-1 change of the volt zero signal on line 181 each time the zero voltage detector 180 (FIG. 6) picks up, but such a change will not activate the one shot unless it occurs after an $\alpha_1$ firing signal has been generated, as indicated by the old $\alpha$ signal on line 206 changing from 0 to 1 (which normally is inverted to a 1-to-0 change on line 226). Thus the instant at which the one shot is actually triggered coincides with the end of a commutation notch (time $t_1$ in FIG. 8). As a result, there is a 1 signal on line 232 for an interval that commences with a zero crossing of the bridge 1 input voltage, that includes the commutation interval following each turn on of either one of the main thyristors in bridge 1, and that extends after the commutation interval for a fixed period of time determined by the one shot device 237.

Another input signal to the AND logic means 220 in the logic circuit is supplied over a line 241 from the output of an initial synchronizing circuit 242 which in turn receives as inputs the signal $\beta$ REF on line 74 and the sync pulses (188) on line 187. FIG. 7 illustrates the presently preferred embodiment of the circuit 242 which will now be described. It comprises a D-type flip flop 243 having a Q bar output connected to the line 241 and a clock input connected to the line 187. The D input of the flip flop 243 is connected via a transistor switch 244 to ground and via a resistor 245 to a +15 volts d-c control power terminal. The base of transistor 244 is connected through a resistor 246 to the line 74. Whenever the signal on line 74 is 0 or negative, the transistor is turned off, a 1 signal is applied to the D input of 243, and the flip flop 243 produces a 0 signal on the line 241, whereby any thyristor turn off operation of the logic circuit 174 is blocked. This is the condition of the initial synchronizing circuit 242 during any period of time when any of the disabling means in the previously described $\beta$ reference circuit 138 (FIG. 4) is effective. But when $\beta$ REF rises from 0 to a positive magnitude following such a period, the transistor 244 turns on to clamp the D input of the flip flop at 0. Thereafter, beginning with the advent of the next sync pulse on line 187, the circuit 242 will provide a 1 signal on the line 241, and normal operation of the one shot 218 is now permitted.

There is a short interval between the time when the transistor 244 turns on and the time of the resulting 0-to-1 change of the signal on line 241. This interval starts at a random instant of time coinciding with the rise of $\beta$ REF to a positive magnitude, but it always expires concurrently with the next zero crossing of the alternating voltage applied to bridge 1. Thus the circuit 242 prevents the logic means 220 from passing to the input line 217 of the one shot 218 the first 0-to-1 signal change that the comparator 215 may produce on its output line 216 in response to $\beta$ REF rising from 0 to a positive magnitude regardless of the instant at which that event occurs. During the half cycle that begins when the aforesaid short interval expires and the signal on line 241 becomes 1, the 0-to-1 change of the comparator output signal on line 216 will take place at the desired $\beta$, and the one shot 218 will operate normally to produce a trigger signal on line 175 in response to either the 0-to-1 change of the signal on line 216 or the 0-to-1 change of the signal on line 225, whichever occurs later. If $\beta$ is then less than $\alpha_1$, the 0-to-1 change on line 225 is later, and consequently the $\beta$ trigger signal is actually produced by the one shot 218 immediately upon termination of the aforesaid interval during which there is a 1 signal on output line 232 of the time delay circuit 235. In this event the actual extinction angle is greater than desired. When $\beta$ exceeds $\alpha_1$ by a sufficient margin, the 0-to-1 change on line 216 is later and the $\beta$ trigger signal coincides with this change. In either case, the generation of firing signals for the auxiliary controlled rectifiers in the forced commutation subcircuit 4 of bridge 1 is properly coordinated with the generation of firing signals for the main thyristors in the same bridge.

The $\beta$ logic circuit includes means 247 responsive to the frequency of the $\beta$ trigger signals on line 175 for providing the signal $\beta$ OK on line 70. The frequency responsive means 247 is suitably constructed and arranged so that $\beta$ OK is 1 except when the one shot device 218 is operating normally in response to periodic 0-to-1 signal changes on line 217 to produce a train of $\beta$ trigger signals having a frequency higher than a predetermined magnitude (e.g., approximately 1.4 times the frequency of V1). This is accomplished in the illustrated embodiment of the invention by connecting first and second one shot devices 248 and 249 in tandem between the line 175 and a conventional NAND logic component 250 whose output is connected to line 70. Each of the devices 248 and 249 is a conventional retriggerable single shot device which will produce a 1 output when triggered by a 0-to-1 change of its input signal and which maintains the 1 output so long at the time that elapses between consecutive triggering events is less than a predetermined period. The predetermined period of the first device 248 is selected to equal the reciprocal of the aforesaid predetermined magnitude of frequency, and the predetermined period of the second device 249 is selected to be approximately twice the period of the first device. As can be seen in FIG. 7, the output of the first device 248 is connected to the input of the second device 249 and also directly to one input of the logic component 250, and the output of the second device 249 is connected via a signal inverter 251 to the other input of 250. The signal at the output of the logic component 250 is 0 only when 1 signals are concurrently being applied to both inputs of this component, as is the case only when the frequency of the trigger signals on line 175 is higher than the aforesaid predetermined magnitude.

Figure 9:
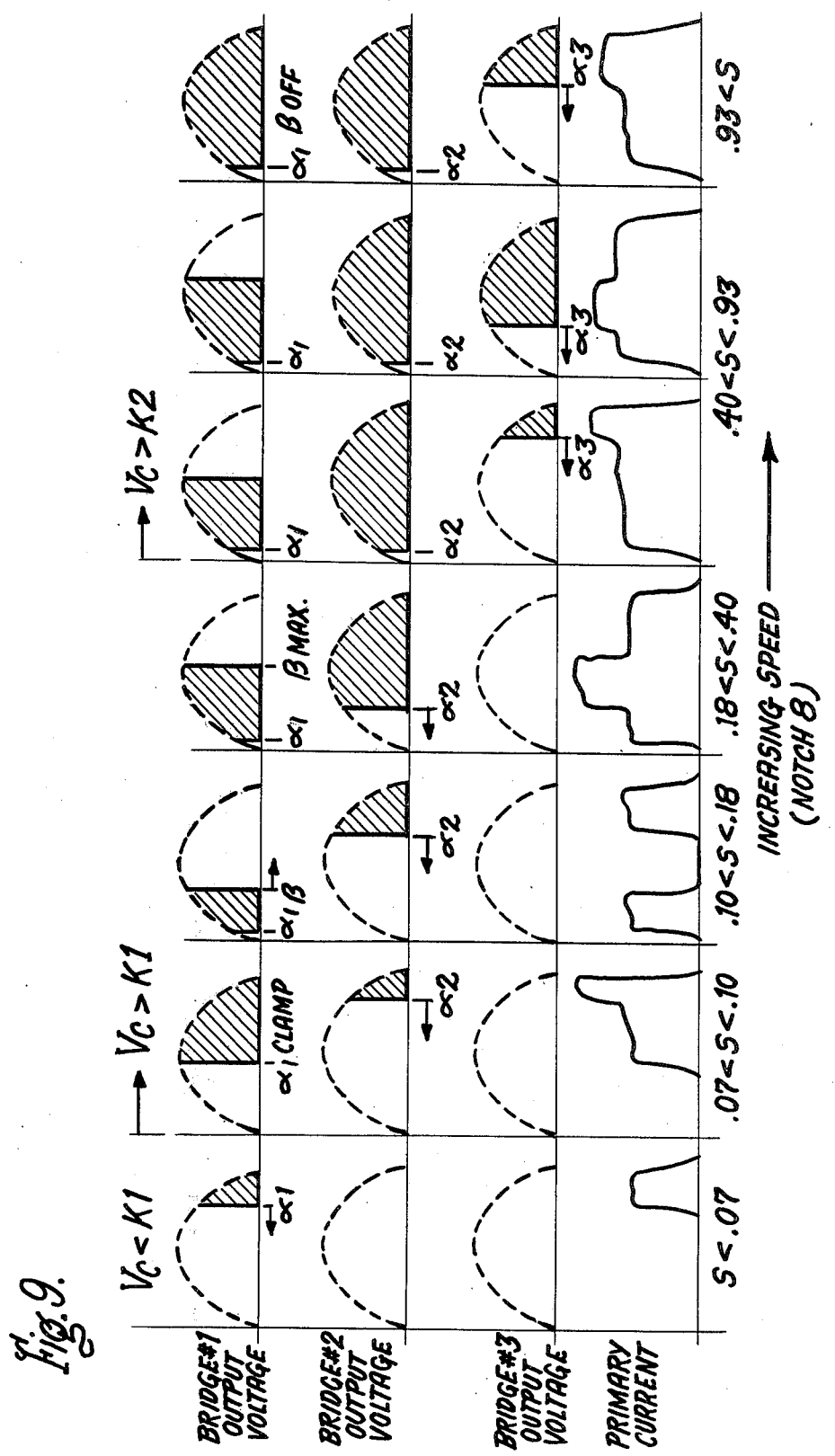
FIG. 9 is a chart illustrating, for each of seven different speeds, the voltages at the d-c output terminals of the three bridges and the current in the transformer primary winding during a half cycle of secondary voltage as the locomotive accelerates from rest to full speed with the throttle set in its maximum (notch 8) position.

Having described the details of the presently preferred embodiment of the converter controls shown in FIG. 2, the operation of the controls will now be briefly summarized with the aid of FIG. 9. When the locomotive is at rest and its throttle 57 is in an idle position, the error signal on line 61 is slightly negative, the control signal $V_c$ on line 63 has a negative magnitude, the speed feedback signal S is 0, all four reference signals on lines 71–74 are negative or zero, and no firing signals are generated for any of the three bridges. Upon moving the throttle to its maximum position (notch 8), I* calls for maximum motor current, the error signal becomes positive and ramps up at a limited rate, and $V_c$ increases as the integral of the error. As $V_c$ rises above 0, the first reference signal on line 71 increases proportionately and the #1 generator 171 becomes operative to generate firing signals for turning on the main thyristors in bridge 1 at an ignition angle that advances (i.e., decreases) from its maximum retarded condition as $V_c$ increases, whereby the bridge 1 output voltage begins increasing. This is illustrated in the first column of FIG. 9 where the shaded area represents the part of the V1 voltage wave that is applied across the traction motors during each half cycle of converter operation.

As the output voltage increases from zero, current flows from the power transformer 38 to the traction motors which start accelerating the locomotive from rest. As speed increases from 0, so does the motor counter emf. Motor curent tracks the increasing rate-limited desired current, and within a few seconds it attains the aforesaid low level at which the signal IL on line 35 changes from 0 to 1. The latter event activates the $\alpha_1$ clamping means 130–135 in the firing reference generator 65 (but this clamp is not effective until later, when the first reference signal rises to the maximum level 87a set by the clamp), and it also turns off the diode 160 in the $\beta$ reference circuit 138 (but the fourth reference signal on line 74 remains negative and signal $\beta$ OK on line 70 remains 1 until later, when the other two disabling means in the circuit 138 have both become ineffective). After the rate-limited desired current signal reaches the maximum value being called for, $V_c$ will continue increasing because more output voltage is required to maintain maximum current as motor speed increases.

As $V_c$ increases, it first attains the critical value that turns off the diode 163 in the $\beta$ reference circuit 138 (but forced commutation is not brought on because the speed responsive disabling means 153–157 in circuit 138 is still effective), and it then attains the value at which the first reference signal reaches the maximum level whereupon $\alpha_1$ stops advancing and is clamped at a predetermined minimum angle (shown at 73°, but could be as small as approximately 50°). At this point the bridge 1 output voltage stops increasing, motor current must decrease with increasing speed, the error signal on line 61 increases appreciably, and $V_c$ quickly rises above its first intermediate value K1 (3.33 volts).

As the locomotive accelerates from rest, motor speed increases through the aforesaid low threshold (0.07 per unit) at which the signal SL on line 30 changes from 0 to 1. At full source voltage, this normally happens before $\alpha_1 = 73°$. The signal INH2 on line 82 now changes from 0 to 1 which enables the #2 generator 172 to operate normally under the control of the second reference signal on line 72, and at the same time the reset circuit 113–115 in the firing reference generator 65 recycles the control signal from which the second reference signal is derived. Whenever the value of this control signal is more than K1 and the speed exceeds 0.07 per unit, firing signals are generated for turning on the main thyristors in bridge 2 at an ignition angle that varies from maximum to minimum limits as $V_c$ increases in the range extending from K1 to K2 (6.67 volts). Consequently the bridge 2 output voltage can increase from zero to maximum and the voltage applied across the traction motors increases correspondingly so as to maintain maximum current as speed continues to increase. The second column of FIG. 9 shows the output voltages of bridges 1 and 2 when $V_c$ is more than K1 and $\alpha_1$ is still clamped at its minimum angle. It can be observed at the bottom of this column that the fundamental component of transformer primary current will now lag the fundamental component of source voltage by an appreciable angle. The resulting low power factor is acceptable because the average magnitude of output voltage of the converter is still relatively low, the total volt-ampere load that the locomotive propulsion system imposes on the wayside power distribution system is correspondingly low, and consequently the system draws only a trivial amount of reactive power.

As motor speed increases through the preselected minimum speed that turns off the diode 159 in the $\beta$ reference circuit 138, the signal on line 141 in this circuit is unclamped, the fourth reference signal rises to a positive level determined by S, and forced commutation is brought on. The minimum speed is approximately 0.10 per unit for notch 8 (it would be higher if the throttle setting were lower), and at this speed the desired $\beta$ is approximately 32°. When the 62 logic circuit 174 starts operating in response to $\beta$ REF rising to a positive level at a random instant during a half cycle of V1, the first $\beta$ trigger signal that it produces on line 175 is delayed by the joint actions of the initial synchronizing circuit 242 and the time delay circuit 235 until after a main thyristor in bridge 1 is turned on in the next half cycle, and therefore the initial $\beta$ will actually be greater than the minimum angle at which $\alpha_1$ is still clamped. Once periodic trigger signals are being normally produced by the $\beta$ logic circuit, the frequency responsive means 247 changes the signal $\beta$ OK on line 70 from 1 to 0, whereupon the $\alpha_1$ clamp 130–135 in the firing reference generator 65 is released and $\alpha_1$ can abruptly decrease to its maximum advanced condition (approximately 15°). Thereafter the actual $\beta$ will be the same as desired, and in notch 8 it increases from 32° as speed increases from 0.10 per unit. The third column of FIG. 9 illustrates this condition. It will be observed that the bridge 1 output voltage is greater before forced commutation is brought on (column 2) then immediately after (column 3); this ensures that $V_c$ will stay above K1 when forced commutation is brought on. The third column of FIG. 9 also illustrates that forced commutation can make the transformer primary current waveform relatively symmetrical with respect to the peak magnitude of source voltage, whereby the fundamental components of current and voltage are nearly in phase with one another and the power factor of the locomotive propulsion system approaches 1.0. It can now be appreciated that if the aforesaid minimum speed were lower so that forced commutation could be brought on while $V_c$ is less than K1 (i.e., while the output voltage from bridge 1 alone is sufficient to supply all the voltage required to maintain maximum motor current), the locomotive would have an undesired leading power factor immediately after forced commutation is brought on.

Soon the increasing speed will attain the threshold (0.18 per unit) at which the diode 145 in the $\beta$ reference circuit 138 turns off to clamp $\beta$ at its predetermined maximum limit (95°), and $\beta$ will remain at this limit so long as speed is higher than this threshold and none of the disabling means in circuit 138 is effective. See the fourth colum of FIG. 9. As the accelerating locomotive passes through its corner point speed (nearly 0.30 per unit), I* begins to decrease and the locomotive enters its constant horsepower, decreasing torque region of operation. Although the desired current is now varying inversely with the square root of S, the motor counter emf increases with S and even more output voltage will be required to maintain the decreasing current as speed continues to increase. Therefore $V_c$ must also continue to increase, and $\alpha_2$ will correspondingly decrease until its maximum advanced condition is reached.

When speed increases through the aforesaid high threshold (0.40 per unit) at which the signal SH on line 31 changes from 0 to 1, the signal INH3 on line 83 changes from 0 to 1 which enables the #3 generator 173 to operate normally under the control of the third reference signal on line 73. At the same time, the reset circuit 116–118 in the firing reference generator 65 recycles the control signal from which the third reference signal is derived. Whenever the value of this control signal is more than K2 and the speed exceeds 0.40 per unit, firing signals are generated for turning on the main thyristors in bridge 3 at an ignition angle that decreases from its maximum limit as $V_c$ increases from K2. Consequently the bridge 3 output voltage can now increase from zero, and the total voltage applied across the traction motors increases correspondingly. The fifth column of FIG. 9 illustrates this condition. Note that the particular speed at which $V_c = K2$ depends on the amplitudes of V1 and V2 and on the maximum limit of $\beta$, and it can actually be higher than 0.40. Once the third brige is turned on, the locomotive power factor decreases (as is evident from a comparison of the primary current waveforms in the fourth and fifth columns of FIG. 9). The higher the speed at which this occurs the better, since the magnitude of load current is now decreasing as a function of increasing speed.

If and when current decreases through the aforesaid low level at which the signal IL on line 35 changes from 1 to 0, the diode 160 in the $\beta$ reference circuit 138 turns on to drive $\beta$ REF on line 74 to a negative magnitude which prevents normal operation of the $\beta$ logic circuit 174 and hence disables the forced commutation subcircuit. When the circuit 174 stops producing periodic $\beta$ trigger signals on line 175, the signal $\beta$ OK on line 70 changes from 0 to 1, but this cannot activate the $\alpha_1$ clamping means 130–135 in the firing reference generator 65 because IL is now 0. Accordingly, $\beta$ is "turned off," $\alpha_1$ remains fully advanced, and bridge 1 can contribute full output voltage as the locomotive approaches its maximum speed (1.0 per unit). If the throttle were still in notch 8, the speed at which the transition of IL from 1 to 0 takes place is approximately 0.93 per unit. The sixth and seventh columns of FIG. 9 respectively show the conditions immediately before and after such a transition. In practice, the throttle setting is usually reduced to a lower notch at high speeds, in which case this transition speed (column X in the table on the right hand side of FIG. 4A) would be lower.

While a preferred embodiment of the invention has been shown and described by way of illustration, various modifications thereof will probably occur to persons skilled in the art. It is therefore intended by the concluding claims to cover all such changes and modifications as fall within the true spirit and scope of this invention.

We claim:

1. Improved means for controlling an electric power converter used to supply direct current to at least one electric motor, said converter comprising the combination of
   a plurality of rectifying circuits each having a-c input terminals, a pair of d-c output terminals, and controllable means including at least one pair of alternately conducting main electric valves for interconnecting said input and output terminals so as to convert alternating voltage at said input terminals to direct voltage of variable average magnitude at said output terminals, the pair of main valves in a first one of said rectifying circuits having cyclically operative valve turn off means respectively associated therewith,
   means for respectively applying a plurality of in-phase alternating voltages from an a-c power source to corresponding input terminals of said rectifying circuits,
   means for serially connecting the output terminal pairs of said rectifying circuits to an electric load circuit including said motor, whereby the voltage applied to said load circuit is the sum of the output voltages of all of said rectifying circuits,
   means for providing speed and current feedback signals respectively representative of the speed of said motor and of the magnitude of current that said converter supplies thereto,
   means responsive to said feedback signals and to a given command signal for producing a control signal having a value that varies between predetermined first and second limits as a function of any error between actual and desired magnitudes of motor current, and
   turn on control means responsive to said control signal for generating a first set of firing signals capable of periodically turning on said main valves in said first rectifying circuit in synchronism with the alternating voltage applied to the input terminals thereof and for generating a second set of firing signals capable of periodically turning on the main valves in a second one of said rectifying circuits in synchronism with the alternating voltage applied to the input terminals thereof, the firing signals of said first set being nominally generated at an ignition angle ($\alpha_1$) that varies from fully retarded to fully advanced as said control signal varies over a first predetermined range of values extending from said first limit to a preselected intermediate value of said control signal and the firing signals of said second set being nominally generated at an ignition angle ($\alpha_2$) that varies from fully retarded to fully advanced as said control signal varies over a second predetermined range of values extending from approximately said preselected intermediate value to another control signal value outside of said first range,
   wherein the improvement comprises turn off control means responsive to said speed feedback signal and operative to control said valve turn off means so that normally said main valves in said first rectifying circuit are periodically turned off in synchronism with the alternating voltage applied to the input terminals thereof at a desired extinction angle ($\beta$) which varies as a function of motor speed.

2. The improvement of claim 1 wherein said turn off control means includes disabling means effective whenever motor speed is lower than a preselected minimum for preventing normal operation of said turn off control means and thereby disabling said valve turn off means, and wherein said turn on control means includes clamping means effective whenever said valve turn off means is disabled and the magnitude of motor current is not lower than a predetermined level for preventing $\alpha_1$ from becoming smaller than a predetermined minimum angle which is larger than approximately 50 electrical degrees.

3. The improvement of claim 2 wherein said preselected minimum speed is dependent on said command signal.

4. The improvement of claim 2 wherein said turn off control means is so arranged that whenever said valve turn off means is not disabled $\beta$ is varied with motor speed up to a first speed threshold and is clamped at a predetermined maximum limit when motor speed is higher than said first threshold.

5. The improvement of claim 4 and further comprising means connected to said turn on control means and responsive to said speed feedback signal for inhibiting said second set of firing signals in response to said motor speed being lower than a second threshold which is less than said preselected minimum speed.

6. The improvement of claim 4 wherein said disabling means is also effective for preventing normal operation of said turn off control means whenever said control signal has a value between said predetermined first limit and the value at which $\alpha_1$ is equal to a certain angle which is smaller than said predetermined maximum limit of $\beta$ but not smaller than said predetermined minimum angle of $\alpha_1$.

7. The improved converter control means of claim 4 for a converter in which there are three rectifying circuits and in which said turn on control means is arranged to generate a third set of firing signals capable of periodically turning on the main valves in said third rectifying circuit in synchronism with the alternating voltage applied to the input terminals thereof, the firing signals of said third set being nominally generated at an ignition angle $(\alpha_3)$ that varies from fully retarded to fully advanced as said control signal varies over a third predetermined range of values extending from approximately said other value that is outside of said first range to said predetermined second limit.

8. The improvement of claim 7 and further comprising means connected to said turn on control means and responsive to said speed feedback signal for inhibiting said second set of firing signals in response to motor speed being lower than a second threshold which is less than said preselected minimum speed and for inhibiting said third set of firing signals in response to motor speed being lower than a third threshold which is greater than said preselected minimum speed.

9. The improvement of claim 7 wherein said disabling means includes means responsive to said current feedback signal for making said disabling means effective to prevent normal operation of said turn off control means whenever the magnitude of motor current is lower than said predetermined level.

10. The improvement of claim 4 and further comprising means associated with said turn off control means for blocking any valve turn off operation thereof during recurrent intervals commencing at each zero crossing of the alternating voltage applied to the input terminals of said first rectifying circuit and terminating in response to the next turn on of a main valve in the same circuit.

11. The improvement of claim 10 wherein said turn off control means is effective to initiate operation of said valve turn off means immediately upon termination of each of said recurrent intervals if $\beta$ is then less than $\alpha_1$ and if said disabling means is not then effective.

12. The improvement of claim 10 wherein said turn off control means includes additional means for blocking any valve turn off operation thereof for a short interval following a period of time when said disabling means is effective, said short interval expiring concurrently with the next zero crossing of the alternating voltage applied to the input terminals of said first rectifying circuit after an effective period of said disabling means.

13. The improvement of claim 1 wherein said valve turn off means is a forced commutation subcircuit comprising at least one pair of auxiliary controlled rectifiers connected in circuit with at least one commutating capacitor across the respective main valves in said first rectifying circuit, whereby each of said main valves in turn is forced to turn off upon turn on of a complementary one of said auxiliary rectifiers, wherein said turn off control means is arranged to produce periodic trigger signals for turning on said auxiliary rectifiers and thereby turning off said main valves at an extinction angle $\beta$ which normally has a predetermined maximum limit, and wherein said turn off control means includes means responsive to said current feedback signal for preventing normal operation of said turn off control means in response to the magnitude of motor current decreasing below a predetermined level.

14. The improvement of claim 13 wherein said current feedback signal responsive means comprises disabling means for preventing the production of said trigger signals whenever either the magnitude of motor current is lower than said predetermined level or motor speed is lower than a preselected minimum which is dependent on said command signal, and wherein said turn on control means includes clamping means effective whenever no trigger signals are being produced and the magnitude of motor current is not lower than said predetermined level for preventing $\alpha_1$ from becoming smaller than a predetermined minimum angle which is larger than approximately 50 electrical degrees.

15. The improvement of claim 14 wherein said turn off control means is so arranged that whenever it is producing trigger signals $\beta$ is varied with motor speed up to a predetermined speed threshold and is clamped at said predetermined maximum limit when motor speed is higher than said predetermined threshold.

* * * * *